United States Patent
Mandell et al.

(10) Patent No.: US 11,619,147 B2
(45) Date of Patent: Apr. 4, 2023

(54) VALVE ACTUATION SYSTEM COMPRISING PARALLEL LOST MOTION COMPONENTS DEPLOYED IN A ROCKER ARM AND VALVE BRIDGE

(71) Applicant: Jacobs Vehicle Systems, Inc., Bloomfield, CT (US)

(72) Inventors: John Mandell, Vernon, CT (US); Marc B. Silva, Willington, CT (US); Justin D. Baltrucki, Canton, CT (US); P. Douglas Aubin, Glastonbury, CT (US)

(73) Assignee: Jacobs Vehicle Systems, Inc., Bloomfield, CT (US)

( * ) Notice: Subject to any disclaimer, the term of this patent is extended or adjusted under 35 U.S.C. 154(b) by 0 days.

(21) Appl. No.: 17/818,251

(22) Filed: Aug. 8, 2022

(65) Prior Publication Data

US 2023/0015394 A1    Jan. 19, 2023

Related U.S. Application Data

(63) Continuation-in-part of application No. 17/247,481, filed on Dec. 12, 2020, now Pat. No. 11,408,310.
(Continued)

(51) Int. Cl.
*F01L 1/26* (2006.01)
*F01L 9/10* (2021.01)
(Continued)

(52) U.S. Cl.
CPC .............. *F01L 9/10* (2021.01); *F01L 1/181* (2013.01); *F01L 1/26* (2013.01); *F01L 1/267* (2013.01);
(Continued)

(58) Field of Classification Search
CPC ... F01L 1/181; F01L 1/22; F01L 1/267; F01L 2001/467; F01L 13/0005; F01L 2013/001; F01L 13/06; F01L 13/065
(Continued)

(56) References Cited

U.S. PATENT DOCUMENTS 6,450,144 B2   9/2002   Janak et al.
8,578,901 B2   11/2013  Ruggiero et al.
(Continued)

FOREIGN PATENT DOCUMENTS

JP   H08158901 A   6/1996
JP   H09317421 A   12/1997
(Continued)

OTHER PUBLICATIONS

International Search Report & Written Opinion of the International Searching Authority for International Application No. PCT/IB2020/061865 dated Feb. 22, 2021, 7 pages.
(Continued)

*Primary Examiner* — Jorge L Leon, Jr.
(74) *Attorney, Agent, or Firm* — Moreno IP Law LLC

(57) ABSTRACT

A valve actuation system comprises a valve actuation motion source configured to provide main and auxiliary valve actuation motions for actuating at least one engine valve via a valve actuation load path. A lost motion subtracting mechanism is arranged in a valve bridge and configured, in a first default operating state, to convey at least the main valve actuation motion and configured, in a first activated state, to lose the main valve actuation motion and the auxiliary valve actuation motion. Additionally, a lost motion adding mechanism is arranged in a rocker arm and configured, in a second default operating state, to lose the auxiliary valve actuation motion and configured, in a second activated state, to convey the auxiliary valve actuation (Continued)

motion, wherein the lost motion adding mechanism is parallel with the lost motion subtracting mechanism in the valve actuation load path at least during the second activated state.

12 Claims, 20 Drawing Sheets

Related U.S. Application Data

(60) Provisional application No. 62/948,107, filed on Dec. 13, 2019.

(51) Int. Cl.
| | |
|---|---|
| *F01L 1/18* | (2006.01) |
| *F01L 1/46* | (2006.01) |
| *F01L 9/40* | (2021.01) |
| *F01L 13/00* | (2006.01) |
| *F01L 13/06* | (2006.01) |
| *F01L 1/22* | (2006.01) |

(52) U.S. Cl.
CPC .............. *F01L 1/46* (2013.01); *F01L 9/40* (2021.01); *F01L 13/0005* (2013.01); *F01L 13/06* (2013.01); *F01L 1/22* (2013.01); *F01L 13/065* (2013.01); *F01L 2001/467* (2013.01); *F01L 2013/001* (2013.01)

(58) Field of Classification Search
USPC .................................. 123/90.16, 90.4, 90.44
See application file for complete search history.

(56) References Cited

U.S. PATENT DOCUMENTS

| | | | |
|---|---|---|---|
| 9,611,767 | B2 | 4/2017 | Baltrucki |
| 9,790,824 | B2 | 10/2017 | Baltrucki et al. |
| 2001/0023671 | A1 | 9/2001 | Vorih |
| 2013/0098319 | A1* | 4/2013 | Methley ................ F01L 1/14 123/90.12 |
| 2014/0238015 | A1 | 8/2014 | Roberts et al. |
| 2014/0326212 | A1* | 11/2014 | Baltrucki ............... F01L 13/06 123/321 |
| 2015/0159521 | A1 | 6/2015 | Baltrucki et al. |
| 2016/0017764 | A1 | 1/2016 | Baltrucki et al. |
| 2016/0006229 | A1 | 3/2016 | Baltrucki et al. |
| 2018/0347412 | A1 | 12/2018 | Hayman et al. |
| 2020/0001243 | A1 | 1/2020 | Baltrucki et al. |
| 2021/0047947 | A1 | 2/2021 | VanWingerden et al. |
| 2021/0131318 | A1 | 5/2021 | VanWingerden et al. |
| 2021/0277807 | A1 | 9/2021 | Cecur et al. |

FOREIGN PATENT DOCUMENTS

| | | |
|---|---|---|
| WO | 2020011400 A1 | 1/2020 |
| WO | 2020253993 A1 | 12/2020 |

OTHER PUBLICATIONS

International Search Report for International App. No. PCT/IB2022/055218 dated Sep. 5, 2022, 3 pages.

Written Opinion of the International Search Authority for International App. No. PCT/IB2022/055218 dated Sep. 5, 2022, 3 pages.

* cited by examiner

VALVE ACTUATION SYSTEM COMPRISING PARALLEL LOST MOTION COMPONENTS DEPLOYED IN A ROCKER ARM AND VALVE BRIDGE

CROSS-REFERENCE TO RELATED APPLICATION

The instant application is a continuation-in-part of co-pending U.S. patent application Ser. No. 17/247,481, filed Dec. 12, 2020 and entitled "VALVE ACTUATION SYSTEM COMPRISING IN-SERIES LOST MOTION COMPONENTS FOR USE IN CYLINDER DEACTIVATION AND AUXILIARY VALVE ACTUATIONS," which prior application claims the benefit of Provisional U.S. Patent Application No. 62/948,107, filed Dec. 13, 2019 and entitled "VALVE ACTUATION SYSTEM COMPRISING IN-SERIES LOST MOTION COMPONENTS FOR USE IN CYLINDER DEACTIVATION AND AUXILIARY VALVE ACTUATIONS." The teachings of the above-listed prior applications are incorporated herein by this reference.

FIELD

The instant disclosure relates generally to valve actuation systems and, in particular, to a valve actuation system comprising lost motion components in parallel along a valve actuation load path, which valve actuation system may be used to implement both cylinder deactivation and auxiliary valve actuations.

BACKGROUND

Valve actuation systems for use in internal combustion engines are well known in the art. During positive power operation of an internal combustion engine, such valve actuation systems are used to provide so-called main valve actuation motions to engine valves, in conjunction with the combustion of fuel, such that the engine outputs power that may be used, for example, to operate a vehicle. Alternatively, valve actuation systems may be operated to provide so-called auxiliary valve actuation motions other than or in addition to the main valve actuation motions. Valve actuation systems may also be operated in a manner so as to cease operation of a given engine cylinder altogether, i.e., no operation in either main or auxiliary modes of operation through elimination of any engine valve actuations, often referred to as cylinder deactivation. As further known in the art, these various modes of operation may be combined to provide to provide desirable benefits. For example, future emissions standards for heavy duty diesel trucks require a technology that improves fuel economy and reduces emissions output. A leading technology that provides both at the same time is cylinder deactivation. It is well documented that cylinder deactivation reduces fuel consumption and increase temperatures that provide for improved aftertreatment emissions control.

A known system for cylinder deactivation is described in U.S. Pat. No. 9,790,824, which describes a hydraulically-controlled lost motion mechanism disposed in a valve bridge, an example of which is illustrated in FIG. 11 of the '824 patent and reproduced herein as FIG. 1. As shown in FIG. 1, the lost motion mechanism comprises an outer plunger 120 disposed with a bore 112 formed in the body 110 of a valve bridge 100. Locking elements in the form of wedges 180 are provided, which wedges are configured to engage with an annular outer recess 172 formed in a surface defining the bore 112. In the absence of hydraulic control applied to an inner plunger 160 (via, in this case, a rocker arm, not shown), an inner piston spring 144 biases the inner plunger 160 into position such that the wedges 180 extend out of openings formed in the outer plunger 120, thereby engaging the outer recess 172 and effectively locking the outer plunger 120 in place relative to the valve bridge body 110. In this state, any valve actuation motions (whether main or auxiliary motions) applied to the valve bridge via the outer plunger 120 are conveyed to the valve bridge body 110 and ultimately to the engine valves (not shown). However, provision of sufficiently pressurized hydraulic fluid to the top of the inner plunger 160 causes the inner plunger 160 to slide downward such that the wedges 180 are permitted to retract and disengage from the outer recess 172, thereby effectively unlocking the outer plunger 120 relative to the valve bridge body 110 and permitting the outer plunger 120 to slide freely within its bore 112, subject to a bias provided by an outer plunger spring 146 toward the rocker arm. In this state, any valve actuation motions applied to the outer plunger 120 will cause the outer plunger 120 to reciprocate in its bore 112. In this manner, and presuming the travel of the outer plunger 120 within its bore 112 is greater than the maximum extent of any applied valve actuation motions, such valve actuation motions are not conveyed to the engine valves and are effectively lost such that the corresponding cylinder is deactivated.

One drawback of deactivating cylinders, however, is that the flow of air mass through the engine is reduced, therefore also reducing the energy in the exhaust system. During vehicle warmup from a cold start, it is important to have an elevated exhaust temperature to rapidly raise the catalyst temperature to an efficient operating temperature. While cylinder deactivation provides an elevated temperature, the noted reduction in air mass flow is ineffective for a fast warmup.

To overcome this shortcoming of cylinder deactivation and provide fast warm up, one proven technology is to advance opening of the exhaust valve to release added thermal energy to the exhaust system, referred to as early exhaust valve opening (EEVO), which is a specific type of auxiliary valve actuation motion in addition to main valve events. In practice, such a system is based on the principle of adding valve actuation motions that are otherwise lost during main valve actuation to provide this early opening event. A system that combines both early exhaust opening and cylinder deactivation capability could meet the warmup requirements, and provide reduced emissions and improved fuel consumption.

A valve actuation system for providing EEVO may be provided using a rocker arm having a hydraulically-controlled lost motion component in the form of an actuator, such as that illustrated in U.S. Pat. No. 6,450,144, an example of which is illustrated in FIG. 19 of the '824 patent and reproduced herein as FIG. 2. In this system, a rocker arm 200 is provide having an actuator piston 210 disposed in a motion imparting end of the rocker arm 200. The actuator piston 210 is biased out of its bore by a spring 217 such that the actuator piston 210 continuously contacts the corresponding engine valve (or valve bridge). Hydraulic passages 231, 236 are provided such that hydraulic fluid can be provided by a control passage 211 to fill the actuator piston bore. In these circumstances, the hydraulic fluid is retained in the bore by virtue of a check valve 241 and as long as the hydraulic passage 236 is not aligned with the control passage 211, in which case the actuator piston 210 is rigidly maintained in an extended position and unable to reciprocate within its bore. On the other hand, when the bore is not filled with hydraulic fluid (or such fluid is evacuated upon alignment of the noted passages 236, 211), the actuator piston 210 is free to reciprocate within its bore to the extent permitted by a lash adjusting screw 204. In such a system, a cam comprises cam lobes for providing both main and auxiliary valve actuation motions. In main valve actuation operation, no hydraulic fluid is provided to the actuator piston 210 such that the actuator piston 210 is permitted to reciprocate within its bore. In this case, so long as the permitted travel of actuator piston 210 into its bore is at least as large as the maximum motion provided by the EEVO lobe, but less than the maximum motion provided by the main event lobe, any valve actuation motions provided by the EEVO lobe will be lost through reciprocation of the actuation piston 210, but main event valve actuations will cause the actuation piston 210 to bottom out within its bore (or through solid contact with some other surface) and thereby convey the main event motion. On the other hand, when the actuator piston is hydraulically-locked in its extended position, the EEVO motions are not lost and are conveyed to the engine valve, though position-based evacuation of the actuator bore (i.e., resetting through alignment of the noted passages 236, 211) prevents over-extension of the engine valve during the main valve event motion.

It should be at least theoretically possible to combine lost motion-based cylinder deactivation and auxiliary valve actuation motion systems of the types described above to provide the desired cylinder deactivation and EEVO operation. However, it is not a given that simply directly combining such systems will provide the desired results.

For example, as described above, EEVO lost motion combines a normal main event lift with an early raised portion on the same camshaft. An example of this is illustrated in FIG. 3. In FIG. 3, a first curve 310 illustrates an idealized version of a main event valve lift that, in this example, has a maximum lift of approximately 14 millimeters. A second curve 311 illustrates a typical actual main event as experienced by the engine valve, which would occur when any EEVO motion provided by the cam is lost, e.g., the above-described rocker arm actuator in FIG. 2 is permitted to reciprocate. The upper, dashed curve 312 illustrates idealized valve lift if all valve actuation motions provided by the EEVO-capable cam are provided, e.g., when the rocker arm actuator is fully extended. As shown, the idealized lift 312 includes an EEVO event 313 of approximately 3 mm of valve lift during valve opening that, in practice, translates to approximately 2 millimeters of valve lift 314. The example illustrated in FIG. 3 also shows occurrence of resetting, whereby the actuator piston is allowed to collapse (i.e., the locked hydraulic fluid in the actuator bore is vented for this cycle of the engine valve), in this example, at approximately 10 mm of lift, thereby causing the normal-lift main event 311 to occur. The combination of these two lift events (as illustrated by the idealized lift profile 312) results in a total stroke of approximately 17 mm and would place, when being lost by the lost motion mechanism illustrated in FIG. 1, relatively high stresses on the outer plunger spring 146 as it attempts to bias the outer plunger 120 throughout the full 17 mm of travel of the outer plunger 120.

As an additional example, it is known that, during cylinder deactivation as described above, the usual force applied by the engine valve springs to bias the rocker arm into continuous contact with a valve actuation motion source (e.g., a cam) is no longer provided. While the outer piston plunger spring 146 provides some force back toward the rocker arm via the outer plunger 120, this force is relatively small and inadequate to control the rocker arm as needed. Thus, a separate rocker arm biasing element is typically provided to bias the rocker arm into contact with the cam, e.g., by applying a biasing force on the motion receiving end of the rocker arm toward the cam via a spring located over the rocker arm. Failure to adequately control the inertia presented by the rocker arm (due to the valve actuation motions that are still applied to the rocker arm despite deactivation) could lead to separation between the rocker arm and cam that, in turn, could lead to damaging impacts between the two. Similarly, the EEVO valve actuation motions that are otherwise lost when EEVO operation is not required still impart inertia to the rocker arm that must be similarly controlled. A complicating factor to such operation by the rocker arm biasing element is that each of these operations—cylinder deactivation and EEVO—typically occur at significantly different ranges of speed.

Normally, cylinder deactivation typically occurs at engine speeds no greater than approximately 1800 rpm and the rocker arm biasing element is configured to provide sufficient force at these speeds to ensure proper contact between the rocker arm and cam. On the other hand, otherwise lost EEVO valve actuation motions will be present even up to high engine speeds (e.g., on the order of 2600 rpm). Thus, to obtain the benefits of combined cylinder deactivation and EEVO operation, the rocker arm biasing element would need to accommodate the higher speed at which EEVO valve actuation motions may still be applied to the rocker arm. Due to the comparatively high speed at which they may still occur, rocker arm control for lost EEVO valve actuation motions requires application of a high force by the rocker arm biasing element. However, this occurs at a small valve lift where the rocker arm bias spring has its lowest preload. On the other hand, cylinder deactivation normally occurs at a lower speed, and throughout a higher lift portion (main valve actuation motions) where the rocker arm biasing element is at an increased preload. However, the challenge of providing a rocker arm biasing element that is capable of both providing a high force at lowest preload (as required by EEVO) and surviving the stresses required during full travel (as required by cylinder deactivation) is difficult to overcome.

SUMMARY

The above-noted shortcomings of prior art solutions are addressed through the provision of a valve actuation system for actuating at least one engine valve in accordance with the instant disclosure. In particular, the valve actuation system comprises a valve actuation motion source, such as a single cam, configured to provide a main valve actuation motion and an auxiliary valve actuation motion for actuating the at least one engine valve via a valve actuation load path. A lost motion subtracting mechanism is arranged in a valve bridge and configured, in a first default operating state, to convey at least the main valve actuation motion and configured, in a first activated state, to lose the main valve actuation motion and the auxiliary valve actuation motion. Additionally, a lost motion adding mechanism is arranged in a rocker arm and configured, in a second default operating state, to lose the auxiliary valve actuation motion and configured, in a second activated state, to convey the auxiliary valve actuation motion, wherein the lost motion adding mechanism is parallel with the lost motion subtracting mechanism in the valve actuation load path at least during the second activated state.

Examples of auxiliary valve actuation motions include at least one of an early exhaust valve opening valve actuation motion, a late intake valve closing valve actuation motion or an engine braking valve actuation motion.

In one embodiment, the valve actuation system further includes an engine controller configured to operate the internal combustion engine using the lost motion subtracting mechanism and the lost motion adding mechanism. In a positive power mode, the engine controller controls the lost motion subtracting mechanism to operate in the first default operating state and the lost motion adding mechanism to operate in the second default operating state. In a deactivated mode, the engine controller controls the lost motion subtracting mechanism to operate in the first activated operating state and the lost motion adding mechanism to operate in the second default operating state. In an auxiliary mode, the engine controller controls the lost motion subtracting mechanism to operate in the first default operating state and the lost motion adding mechanism to operate in the second activated operating state.

A corresponding method is also disclosed.

BRIEF DESCRIPTION OF THE DRAWINGS

The features described in this disclosure are set forth with particularity in the appended claims. These features and attendant advantages will become apparent from consideration of the following detailed description, taken in conjunction with the accompanying drawings. One or more embodiments are now described, by way of example only, with reference to the accompanying drawings wherein like reference numerals represent like elements and in which:

DETAILED DESCRIPTION OF THE PRESENT EMBODIMENTS

Figure 4:
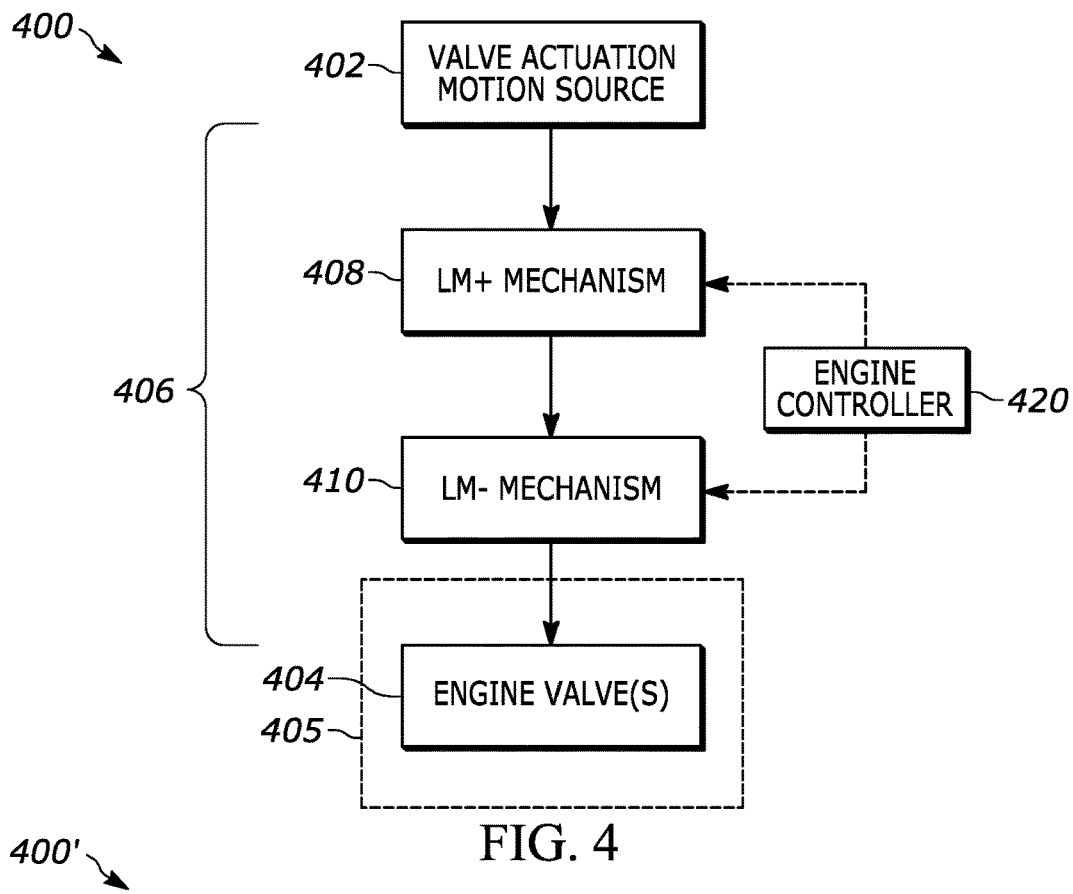
FIGS. 4 and 5 are schematic illustrations of embodiments of a valve actuation system in accordance with the instant disclosure.

FIG. 4 schematically illustrates a valve actuation system 400 in accordance with the instant disclosure. In particular, the valve actuation system 400 comprises a valve actuation motion source 402 that serves as the sole source of valve actuation motions (i.e., valve opening and closing motions) to one or more engine valves 404 via a valve actuation load path 406. The one or more engine valves 404 are associated with a cylinder 405 of an internal combustion engine. As known in the art, each cylinder 405 typically has at least one valve actuation motion source 402 uniquely corresponding thereto for actuation of the corresponding engine valve(s) 404. Further, although only a single cylinder 405 is illustrated in FIG. 4, it is appreciated that an internal combustion engine may comprise, and often does, more than one cylinder and the valve actuation systems described herein are applicable to any number of cylinders for a given internal combustion engine.

The valve actuation motion source 402 may comprise any combination of known elements capable of providing valve actuation motions, such as a cam. The valve actuation motion source 110 may be dedicated to providing exhaust motions, intake motions, auxiliary motions or a combination of exhaust or intake motions together with auxiliary motions. For example, in a presently preferred embodiment, the valve actuation motion source 402 may comprise a single cam configured to provide a main valve actuation motion (exhaust or intake) and at least one auxiliary valve actuation motion. As a further example, in the case where the main valve actuation motion comprises a main exhaust valve actuation motion, the at least one auxiliary valve actuation motion may comprise an EEVO valve event and/or a compression-release engine braking valve event. As yet a further example, in the case where the main valve actuation motion comprises a main intake valve actuation motion, the at least one auxiliary valve actuation motion may comprise a late intake valve closing (LIVC) valve event. Sill further types of auxiliary valve actuation motions that may be combined on a single cam with a main valve actuation motion may be known to those skilled in the art, and the instant disclosure is not limited in this regard.

The valve actuation load path 406 comprises any one or more components deployed between the valve actuation motion source 402 and the at least one engine valve 404 and used to convey motions provided by the valve actuation motion source 402 to the at least one engine valve 404, e.g., tappets, pushrods, rocker arms, valve bridges, automatic lash adjusters, etc. Further, as shown, the valve actuation load path 406 also includes a lost motion adding (LM+) mechanism 408 and a lost motion subtracting (LM−) mechanism 410. As used herein, an LM+ mechanism is a mechanism that defaults to or is "normally" in a state (i.e., when a controlling input is not asserted) in which the mechanism does not convey any auxiliary valve actuation motions applied thereto and may or may not convey any main valve actuation motions applied thereto. On the other hand, when an LM+ mechanism is in an activated state (i.e., when a controlling input is asserted), the mechanism does convey any auxiliary valve actuation motions applied thereto and also conveys any main valve actuation motions applied thereto. Furthermore, As used herein, an LM− mechanism is a mechanism that defaults to or is "normally" in a state (i.e., when a controlling input is not asserted) in which the mechanism does convey any main valve actuation motions applied thereto and may or may not convey any auxiliary valve actuation motions applied thereto. On the other hand, when an LM− mechanism is in an activated state (i.e., when a controlling input is asserted), the mechanism does not convey any valve actuation motions applied thereto, whether main or auxiliary valve actuation motions. In short, an LM+ mechanism, when activated, is capable of adding or including valve actuation motions relative to its default or normal operating state, whereas an LM− mechanism, when activated, is capable of subtracting or losing valve actuation motions relative to its default or normal operating state.

Figure 1:
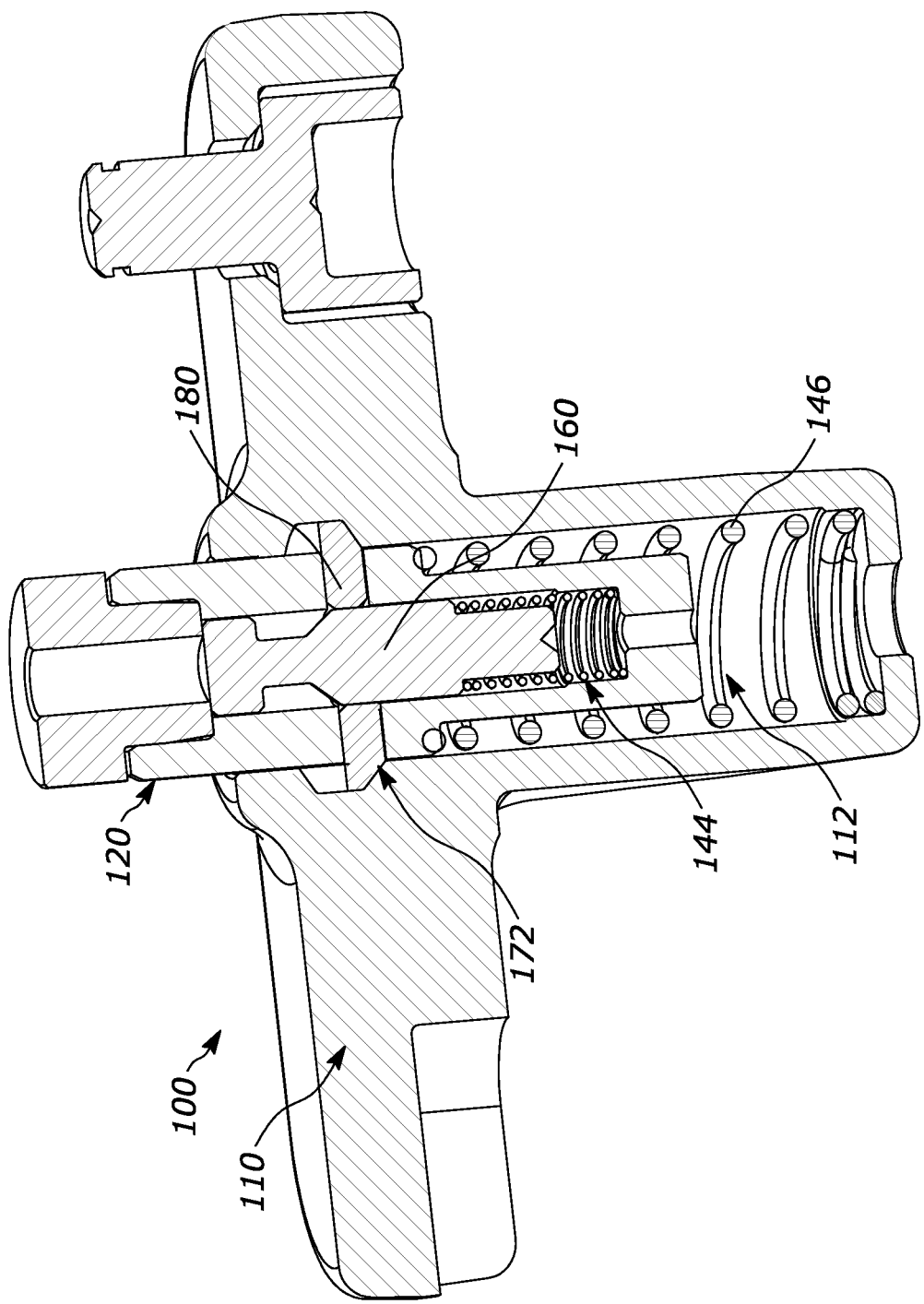
FIG. 1 illustrates a lost motion mechanism suitable for providing cylinder deactivation in accordance with prior art techniques.

Various types of lost motion mechanisms that may serve as LM+ or LM− mechanisms are well known in the art, including hydraulically- or mechanically-based lost motion mechanisms that may be hydraulically-, pneumatically-, or electromagnetically-actuated. For example, the lost motion mechanism depicted in FIG. 1 and taught in U.S. Pat. No. 9,790,824 (the teachings of which are incorporated herein by this reference), is an example of a mechanically locking LM-mechanism that is hydraulically-controlled. As described above, in the absence of hydraulic fluid input to the inner plunger 160 (i.e., in the default state), the locking elements 180 are received in the outer recess 772 thereby "locking" the outer plunger 120 to the body 120 such that actuation motions applied thereto are conveyed. On the other hand, when hydraulic fluid input is provided to the inner plunger 160 (i.e., in the activated state), the locking elements 180 are permitted to retract thereby "unlocking" the outer plunger 120 from the body 120 such that actuation motions applied thereto are not conveyed or lost. As another example, the lost motion mechanism depicted in FIG. 2 and taught in U.S. Pat. No. 6,450,144 (the teachings of which are incorporated herein by this reference), is an example of a hydraulically-based LM+ mechanism that is hydraulically-controlled. As described above, in the absence of hydraulic fluid input to the passages 231, 236 (i.e., in the default state), the actuator piston 210 is free to reciprocate in its bore such that any actuation motions applied thereto that are lesser in magnitude than the maximum distance that the actuator piston 210 can retract into its bore (the actuator piston stroke length) are not conveyed or lost, whereas any actuation motions applied thereto that are greater than the actuator piston stroke length are conveyed.

As further depicted in FIG. 4, an engine controller 420 may be provided and operatively connected to the LM+ and LM− mechanisms 408, 410. The engine controller 420 may comprise any electronic, mechanical, hydraulic, electrohydraulic, or other type of control device for controlling operation of the LM+ and LM− mechanisms 408, 410, i.e., switching between their respective default and activated operating states as described above. For example, the engine controller 420 may be implemented by a microprocessor and corresponding memory storing executable instructions used to implement the required control functions, including those described below, as known in the art. It is appreciated that other functionally equivalent implementations of the engine controller 130, e.g., a suitable programmed application specific integrated circuit (ASIC) or the like, may be equally employed. Further, the engine controller 420 may include peripheral devices, intermediate to engine controller 420 and the LM+ and LM− mechanisms 408, 410, that allow the engine controller 420 to effectuate control over the operating state of the LM+ and LM− mechanisms 408, 410. For example, where the LM+ and LM− mechanisms 408, 410 are both hydraulically-controlled mechanisms (i.e., responsive to the absence or application of hydraulic fluid to an input), such peripheral devices may include suitable solenoids, as known in the art.

Figure 5:
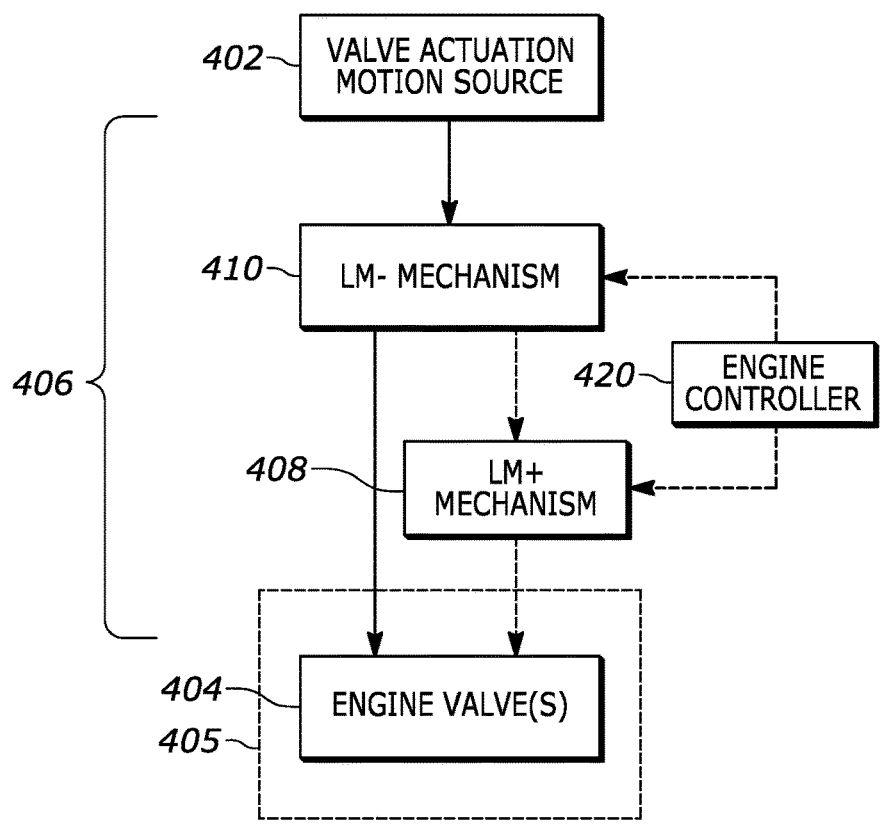

In the system 400 illustrated in FIG. 4, the LM+ mechanism 408 is arranged closer along the valve actuation load path 406 to the valve actuation motion source than the LM− mechanism 410. An example of such a system is described in further detail below with reference to FIGS. 6-12. However, this is not a requirement. For example, FIG. 5 illustrates a valve actuation system 400', in which like reference numerals refer to like elements as compared to FIG. 4, where the LM− mechanism 410 is arranged closer to the valve actuation motion source 402 that the LM+ mechanism 408. Examples of such a system are described in further detail below with reference to FIGS. 12 and 13. Additionally, in the systems illustrated in FIGS. 4 and 5, the LM+ mechanism 408 and LM− mechanism 410 are illustrated being in series with each other (at least during the second activated state of the LM+ mechanism). However, once again, this is not a requirement. For example, FIG. 15 (as described below) illustrates a valve actuation system 1500, in which like reference numerals refer to like elements as compared to FIG. 4, where the LM− mechanism 410' is arranged in parallel the LM+ mechanism 408' within the valve actuation load path 406. Examples of such a system are described in further detail below with reference to FIGS. 16-23.

Referring again to FIG. 4, the LM+ mechanism 408 is in series along the valve actuation load path 406 with the LM− mechanism 410 in all operating states of the LM+ mechanism 408. That is, whether the LM+ mechanism 408 is in its default state or in its activated state as described above, any main valve actuation motions provided by the valve actuation motion source 402 are conveyed by the LM+ mechanism 408 to the LM− mechanism 410. However, once again, this is not a requirement, as illustrated in FIG. 5 where the LM+ mechanism 408 is illustrated either in series or not in series with the LM− mechanism 410 as a function of the operating state of the LM+ mechanism 408. In this case, when the LM+ mechanism 408 is in its default operating state, i.e., when it is controlled to lose any auxiliary valve actuation motions applied thereto, the LM+ mechanism 408 plays no role in conveying main valve actuation motions conveyed by the LM− mechanism 410; this is illustrated by the solid arrow between the LM− mechanism 410 and the engine valve(s) 404. In effect, in this state, the LM+ mechanism 408 is removed from the valve actuation load path 406 as depicted in FIG. 5. On the other hand, when the LM+ mechanism 408 is in its activated operating state, i.e., when it is controlled to convey any auxiliary valve actuation motions applied thereto, the LM+ mechanism 408 participates in the conveyance of both the main valve actuation motions and the auxiliary valve actuation motions that are received from the LM− mechanism 410, thereby effectively placing the LM+ mechanism 408 in series therewith; this is illustrated by the dashed arrows between the LM− mechanism 410 and the LM+ mechanism 408, and the LM+ mechanism 408 and the engine valve(s) 404.

Figure 14:
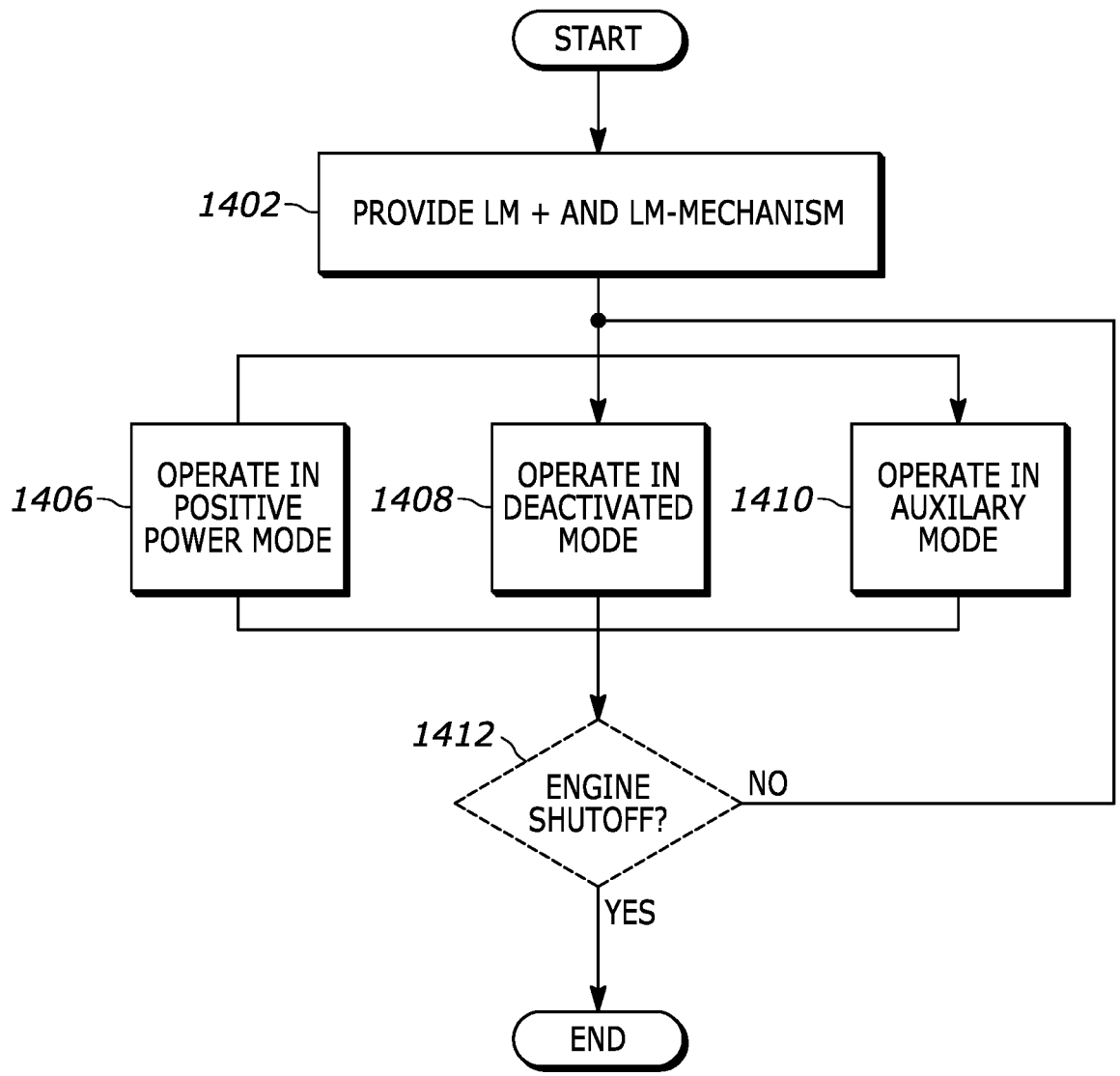
FIG. 14 is a flowchart illustrating a method of operating an internal combustion engine in accordance with the instant disclosure.

The valve actuation systems 400, 400' of FIGS. 4 and 5 facilitate operation of the cylinder 405, and consequently the internal combustion engine, in a positive power mode, a deactivated mode or an auxiliary mode in systems having a single valve actuation motions source 402 providing all valve actuation motions to the engine valve(s) 404. This is further described with reference to the method illustrated in FIG. 14. At block 1402, LM+ and LM− mechanisms, as described above, are arranged in a valve actuation load path. In particular, the LM− mechanism is configured, in a first default operating state, to convey at least main valve actuation motions applied thereto and configured, in a first activated state, to lose any main valve actuation motion and the auxiliary valve actuation motion applied thereto. Additionally, the LM+ mechanism is configured, in a second default operating state, to lose any auxiliary valve actuation motions applied thereto and configured, in a second activated state, to convey the auxiliary valve actuation motion, wherein the LM+ mechanism is in series with the LM− mechanism in the valve actuation load path at least during the second activated state.

Having provisioned a valve actuation system at step 1402, processing proceeds at any of blocks 1406-1410, where engine is respectively operated in a positive power mode, a deactivated mode or an auxiliary mode based on control of the operating states of the LM+ and LM− mechanisms. Thus, at block 1406, in order to operate the engine in the positive power mode, the LM− mechanism is placed in its first default operating state and the LM+ mechanism is placed in its second default operating state. In this mode, then, the LM+ mechanism will not convey any auxiliary valve actuation motions but may convey any main valve actuation motions (depending on whether the LM+ mechanism is arranged as in FIG. 4 or FIG. 5) that are conveyed by the LM− mechanism. The net effect of this configuration is that only main valve actuation motions are conveyed to the engine valve(s), as required for positive power operation.

At block 1408, in order to operate the engine in the deactivated mode, the LM− mechanism is placed in its first activated operating state and the lost motion adding mechanism is in its second default operating state. In this mode, then, the LM− mechanism will not convey any valve actuation motions applied thereto. As a result, the corresponding cylinder will be deactivated to the extent that no valve actuation motions will be conveyed to the engine valve(s). Given this operation of the LM− mechanism, the operating state of the LM+ mechanism will have no effect on the engine valve(s). However, in a presently preferred embodiment, during deactivated mode operation, the LM+ mechanism placed in its second default operating state.

At block 1410, in order to operate the engine in the auxiliary mode, the LM− mechanism is placed in its first default operating state and the LM+ mechanism is placed in its second activated operating state. In this mode, then, the LM+ mechanism will convey any auxiliary valve actuation motions and any main valve actuation motions that are conveyed by the LM− mechanism. The net effect of this configuration is that both main valve actuation motions and auxiliary valve actuation motions are conveyed to the engine valve(s), thereby providing for whatever auxiliary operation is provided by the particular auxiliary valve actuation motions, e.g., EEVO, LIVC, compression-release engine braking, etc.

Operation of the engine between any of the various modes provided at steps 1406-1410 may continue for as long as the engine is running, as illustrated by block 1412.

Figure 6:
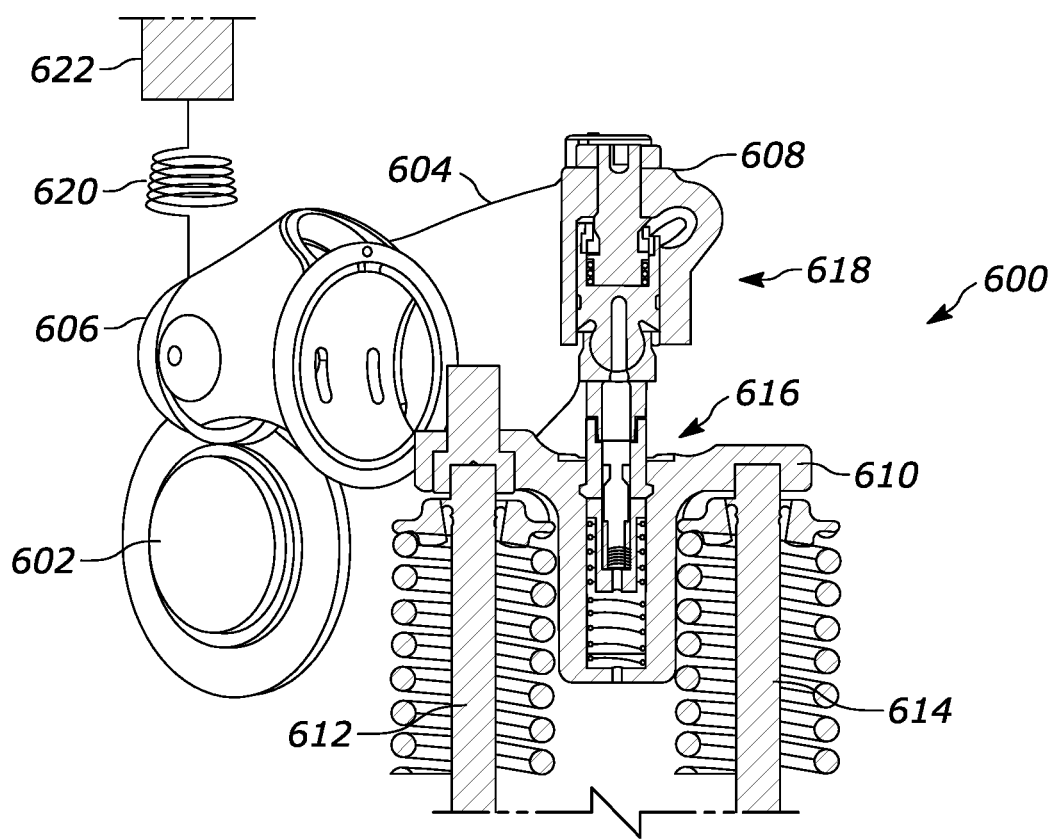
FIG. 6 illustrates a partial cross-sectional view of an embodiment of a valve actuation system in accordance with embodiment of FIG. 4.

FIG. 6 illustrates a partial cross-sectional view of a valve actuation system 600 in accordance with the embodiment of FIG. 4. In particular, the system 600 comprises a valve actuation motion source 602 in the form of a cam operatively connected to a rocker arm 604 at a motion receiving end 606 of the rocker arm 604. A rocker arm biasing element 620 (e.g., a spring), reacting against a fixed surface 622, may be provided to assist in biasing the rocker arm 604 into contact with the valve actuation motion source 602. As known in the art, the rocker arm 604 rotationally reciprocates about a rocker shaft (not shown), thereby imparting valve actuation motions provided by the valve actuation motion source, via a motion imparting end 608 of the rocker arm 604, to a valve bridge 610. In turn, the valve bridge 610 is operatively connected to a pair of engine valves 612, 614. As further shown, the valve bridge 610 comprises a LM− mechanism 616 (locking piston) of the type illustrated and described in FIG. 1 above, whereas the rocker arm 604 includes a LM+ mechanism 618 (actuator) of the type substantially similar to that illustrated and described above relative to FIG. 2.

Figure 7:
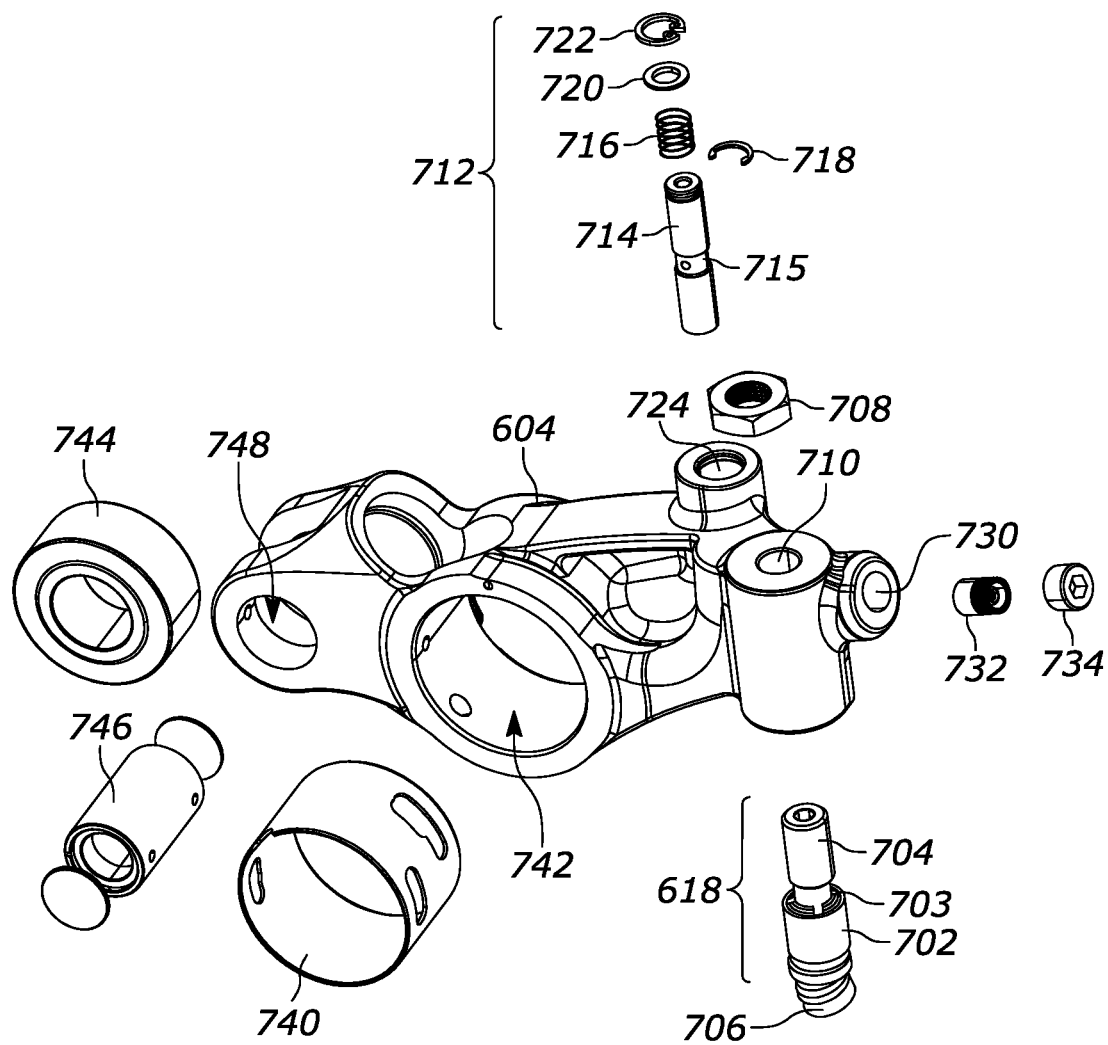
FIG. 7 is an exploded view of a resetting rocker arm in accordance with the embodiment of FIG. 6.
Figure 9:
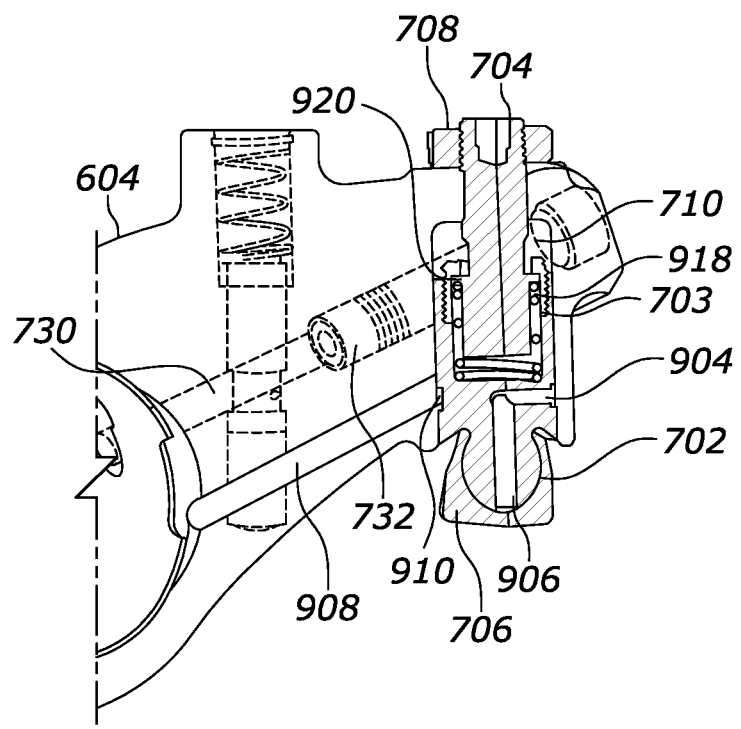

Details of the LM+ mechanism 618 are further illustrated in FIG. 7 along with other components arranged within the rocker arm 604. The LM+ mechanism 618 comprises an actuator piston 702 that is attached to a retainer 703 such that the actuator piston 702 is slidably arranged on a lash adjustment screw 704. Further details of the LM+ mechanism 618 are described with reference to FIG. 9 below. As best shown in FIG. 9, the lash adjustment screw 704 is threadedly fastened in an actuator piston bore 710 such that the LM+ mechanism 618 is arranged in a lower portion of the actuator piston bore 710. A locking nut 704 is provided to secure the lash adjustment screw 704 at its desired lash setting in use.

FIG. 7 also illustrates a resetting assembly 712 that is arranged within in a resetting assembly bore 724, which includes openings on the top and bottom (not shown) of the rocker arm 604. The resetting assembly 712 comprises a reset piston 714 slidably arranged within the resetting assembly bore 724. A resetting piston spring 715 is arranged above the resetting piston 714 and a lower end of the resetting piston spring 716 is secured to the resetting piston 714 using a c-clip 718 or other suitable component. A washer 720 is arranged at an upper end of the resetting piston spring 716. The resetting assembly 712 is maintained in the resetting assembly bore 724 by a spring clip 722, as known in the art. As described in further detail below relative to FIGS. 10 and 11, the resetting piston spring 716 biases the resetting piston 714 out of the lower opening of the resetting assembly bore 724 such that the resetting piston 714 is capable of contacting a fixed surface (not shown in FIG. 7). As the rocker arm 604 reciprocates, the resetting piston 714 slides within the resetting assembly bore 724 in a controllable fashion dictated by rotation of the rocker arm 604. In particular, at a desired position of the rocker arm 604, the resetting piston 714 may be configured such that an annular channel 715 formed in the resetting piston registers with a resetting passage 802 (FIG. 8) to effectuate a reset of the LM+ mechanism 618, as described in further detail below.

FIG. 7 further illustrates an upper hydraulic passage 730 formed in the rocker arm 604 that receives a check valve 732. As described in greater detail below, the upper hydraulic passage 730 provides hydraulic fluid (provided by a suitable supply passage formed in a rocker shaft, not shown) to the actuator piston bore 710 to control operation of the LM+ mechanism 618. In order to ensure a fluid-tight seal on the upper hydraulic passage 730 following installation of the check valve 732, a threaded plug 734 or similar device may be employed. Additionally, for completeness, FIG. 7 also illustrates a rocker arm bushing 740 that may be inserted in a rocker shaft opening 742 and over a rocker shaft as known in the art. Additionally, a cam follower 744 may be mounted on a cam follower axle 746 arranged within a suitable opening 748.

Figure 2:
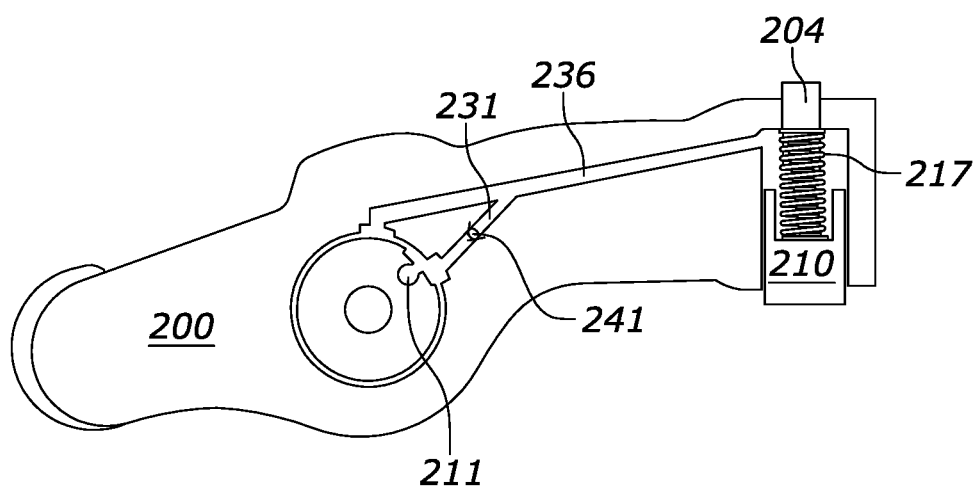
FIG. 2 illustrates a lost motion mechanism suitable for providing auxiliary valve actuation in accordance with prior art techniques.

Unlike the actuator piston 210 in FIG. 2, however, and as best illustrated in FIG. 9, the actuator piston 702 of the LM+ mechanism 618 includes hydraulic passages 904, 906 that permit hydraulic fluid to be supplied to the LM− mechanism 616 via the actuator piston 702. As shown in FIG. 9, a lower hydraulic passage 908 formed in the rocker arm 604 receives hydraulic fluid from a supply channel in the rocker shaft (not shown) and routes the hydraulic fluid to a lower portion of an actuator piston bore 710. The actuator piston 702 comprises an annular channel 910 formed in a sidewall surface thereof that registers with the hydraulic supply passage 908 throughout the entire stroke of the actuator piston 702. In turn, the annular channel 910 communicates with a horizontal passage 904 and a vertical passage 906 formed in the actuator piston 702. The vertical passage 906 directs hydraulic fluid to the swivel 706 having an opening formed therein for the passage of the hydraulic fluid to the LM− mechanism 616. In this manner, hydraulic fluid may be selectively supplied to as a control input to the LM− mechanism 616.

As described above, and further shown in FIG. 9, the LM+ mechanism 618 comprises the lash adjustment screw 704 extending into the actuator piston bore 710. An actuator piston spring 918 is disposed between the lash adjustment screw 704 and the actuator piston 702 and abuts a lower surface of a shoulder 920 formed in the lash adjustment screw 704, thereby biasing the actuator piston 702 out of the actuator piston bore 710. In this embodiment, the actuator piston 702 is fastened via suitable threading to a retainer 703 that engages with an upper surface of the lash adjustment screw shoulder 920, thereby limiting the outward stroke of the actuator piston 702, as described in further detail below.

Figure 8:
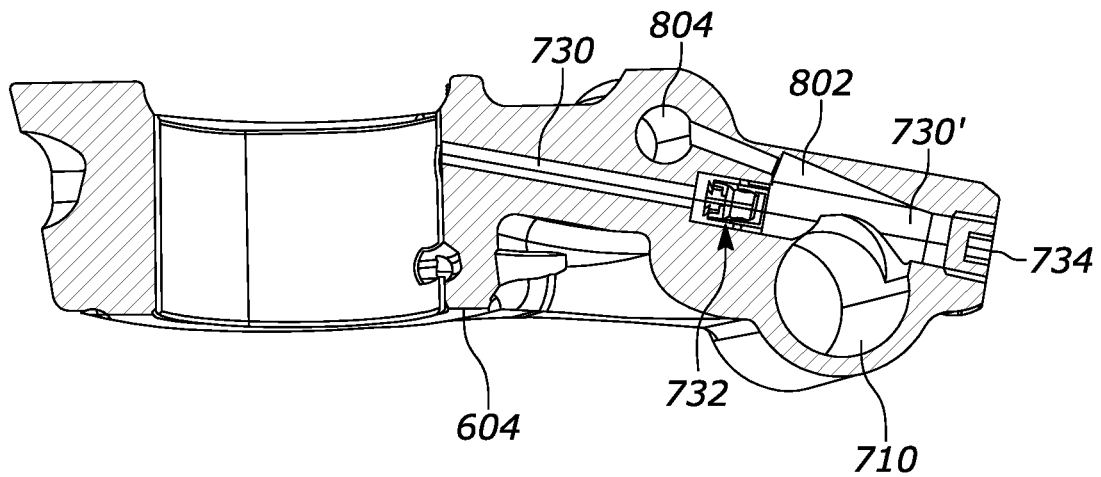
FIGS. 8-11 are respective partial top and side cross-sectional views of the resetting rocker arm in accordance with the embodiment of FIGS. 6-8.

FIGS. 8 and 9 further illustrate (in phantom in FIG. 9) the upper hydraulic passage 730 formed in the rocker arm 604 for selectively supplying hydraulic fluid (e.g., via a high speed solenoid, not shown) to the actuator piston bore 710 above the actuator piston 702. (Note that, in FIG. 8, the various components forming the LM+ mechanism 618 and the resetting assembly 712 are not shown for ease of illustration.) The check valve 732 is provided in a widened portion 730' of the upper hydraulic passage 730 to prevent back flow of hydraulic fluid from the actuator piston bore 710 back to the supply passage feeding the upper hydraulic passage 730. In this manner, and absent resetting of the LM+ mechanism 618 as described below, a high-pressure chamber in the actuator piston bore 710 may be formed between the check valve 732 and the actuator piston 702 such that a locked volume of hydraulic fluid maintains the actuator piston 702 in an extended (activated) state.

Figure 3:
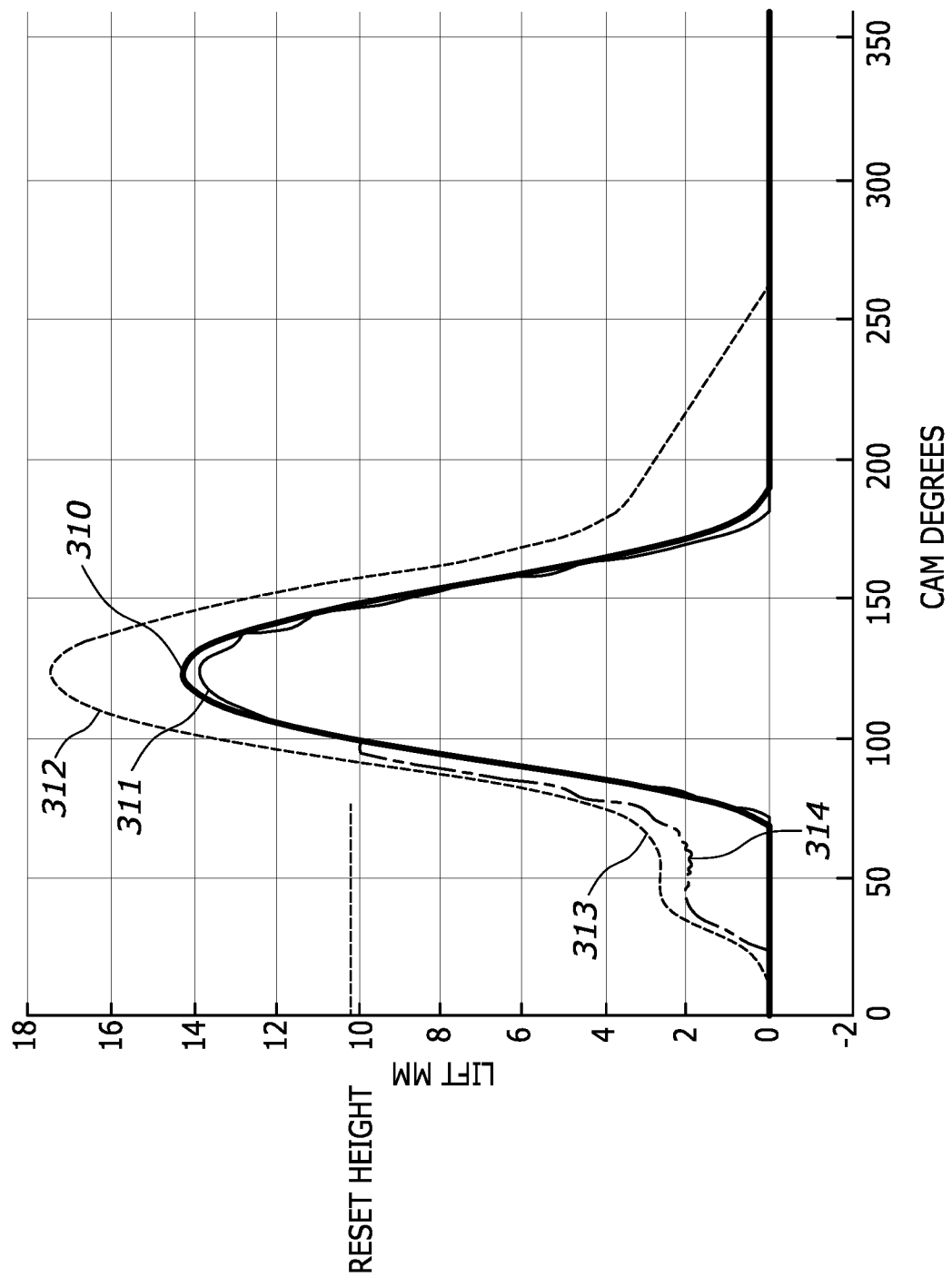
FIG. 3 is a graph illustrating an example of EEVO valve actuation motions in accordance with the instant disclosure.

As described above relative to FIG. 3, valve actuation systems in which a single valve actuation motion source provides both main and auxiliary valve actuation motions may require the ability to reset in order to avoid over-extension of the engine valve(s) during combined auxiliary and main valve actuation motions. In the context of the embodiment illustrated in FIGS. 6-11, venting of the locked volume of hydraulic fluid and reset of the actuator piston 702 is provided through operation of the resetting assembly 712. As best shown in FIG. 8, a resetting passage 802 is provided in fluid communication with that portion of the actuation piston bore 710 forming the high-pressure chamber with the actuator piston 702, and the resetting piston bore 804. The resetting piston 714 is effectively a spool valve having an end extending out of the bottom of the rocker arm 604 under bias of the resetting piston spring 716. In the embodiment illustrated in FIGS. 10 and 11, the resetting piston 714 is of sufficient length and the resetting piston spring 716 has sufficient stroke to ensure that the resetting piston 714 continuously contacts a fixed contact surface 1002 throughout all positions of the rocker arm 604.

Figure 10:
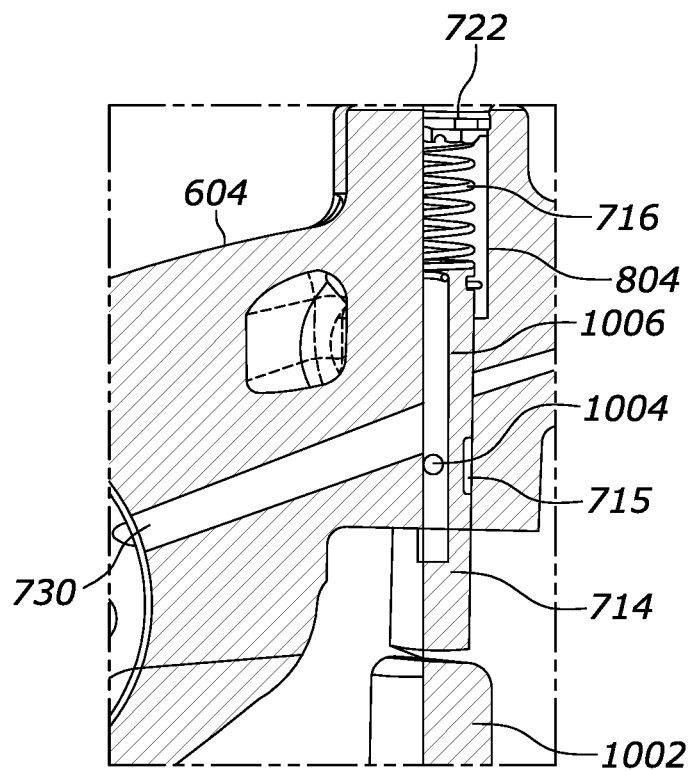
Figure 11:
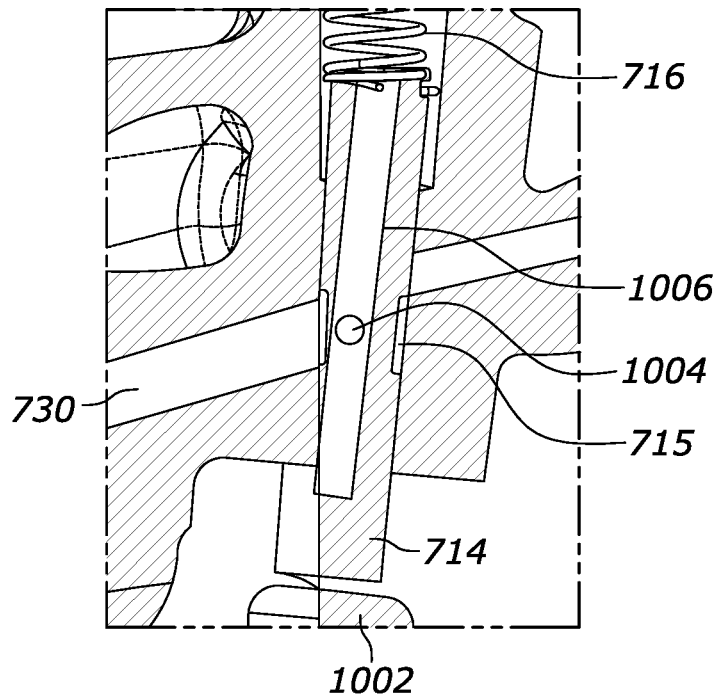

As shown in FIG. 10, the rocker arm 604 is at base circle relative to the cam 602 (i.e., rotated to the fullest extent toward the cam 602). In this state, as well as relatively low lifts (e.g., below the reset height shown in FIG. 3), the annular channel 715 is not aligned with the resetting passage 802 (hidden behind the upper hydraulic passage 730 as shown in FIGS. 10 and 11) such that an outer diameter of the resetting piston 714 seals off communication with resetting passage 802, thereby maintaining a trapped volume of fluid (when provided) in the actuator piston bore 710. As the rocker arm 604 rotates at higher valve lifts (e.g., at or above the reset height shown in FIG. 3) as shown in FIG. 11, the resetting piston 714 pivots about its contact point with the fixed surface 1002 and slides relative to the resetting piston bore 804 such that the annular channel 715 registers with the resetting passage 802, thereby permitting the trapped hydraulic fluid to flow through the annular channel 715, into a radial hole 1004 formed in the resetting piston 714 and vent through the top of an axial passage 1006 (shown in phantom) formed in the resetting piston 714. As the rocker arm 604 once again rotates back following the high lift event, as in FIG. 10, the resetting piston 714 translates in its bore 804 and once again seals off the resetting passage 802 thereby permitting refill of the actuator piston bore 710.

As noted above, the resetting assembly 712 illustrated in FIGS. 6-11 is configured to maintain constant contact with the fixed contact surface 1002. However, it is appreciated that this is not a requirement. For example, the resetting assembly could instead comprise a poppet-type valve that contacts a fixed surface only when the required reset height is achieved.

As noted previously, the rocker arm biasing element 620 may be provided to assist in biasing the rocker arm 604 into contact with the cam 602. A feature of the disclosed system 600 is that individually, neither the rocker arm biasing element 620 nor the actuator piston spring 918 is configured to individually provide sufficient force to bias the rocker arm 604 into contact with the cam 602 throughout substantially all operating conditions. However, the rocker arm biasing element 620 and the actuator piston spring 918, in this embodiment, are selected to work in combination for this purpose throughout substantially all operating conditions for the rocker arm 604. For example, to aid in biasing the rocker arm 604 towards the cam 602, the actuator piston spring 918 provide a high force only during relatively low lift valve actuation motions (e.g., EEVO, LIVC, etc.) where it is needed most due to potential high speed operation. If uncontrolled, the biasing force applied by the actuator piston spring 918 could cause the actuator piston 702 to push against the LM− mechanism 616 with significant force. Where the LM− mechanism 616 is a mechanical locking mechanism such as the described with reference to FIG. 1, such force could be strong enough to interfere with the ability of the locking elements 180 to extend and retract, and thereby prevent locking and unlocking of the LM− mechanism 616. The travel limit imposed by the lash adjustment screw shoulder 920 on the actuator piston 702 prevents such excessive loading on the LM− mechanism 616, thereby preserving normally-provided lash space within the LM− mechanism 616 that permits the locking elements 180 to freely extend/retract as needed.

Additionally, the extension of the actuator piston 702 by the actuator piston spring 918, though relatively small, nonetheless reduces the range stress that the outer plunger spring 746 will have to endure. In turn, the actuator piston spring 918 can be a high force, low travel spring that provides the high force that is particularly needed for low lift, potentially high speed valve actuation motions. This burden sharing by the actuator piston spring 918 and the outer plunger spring 746 could also alleviate the need for the rocker arm biasing element 620 to provide a high preload, and permits design of the rocker arm biasing element 620 to be focused on the lower speed, higher lift portion for the main valve actuation motions that occur during deactivated state operation, which is a less stringent design constraint.

Figure 12:
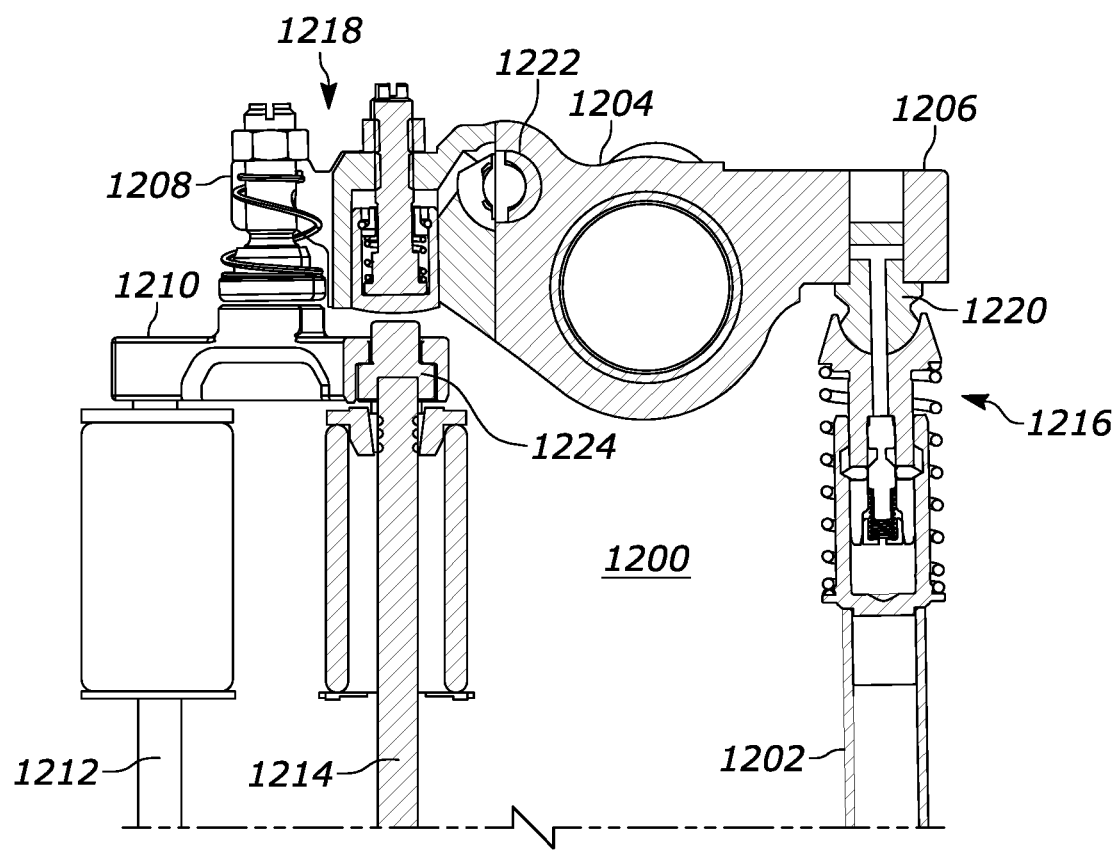
FIG. 12 is a partial cross-sectional view of first embodiment of a valve actuation system in accordance with the embodiment of FIG. 5.

FIG. 12 illustrates a partial cross-sectional view of a valve actuation system 1200 in accordance with the embodiment of FIG. 5. In this system 600 the valve actuation motion source comprises a cam (not shown) operatively connected at a motion receiving end 1206 of a rocker arm 1204 via a push tube 1202 and an intervening LM− mechanism 1216 of the type illustrated and described in FIG. 1 above. As with the embodiments illustrated in FIGS. 6-11, the rocker arm 1204 rotationally reciprocates about a rocker shaft (not shown), thereby imparting valve actuation motions provided by the valve actuation motion source, via a motion imparting end 1208 of the rocker arm 1204, to a valve bridge 1210. In turn, the valve bridge 1210 is operatively connected to a pair of engine valves 1212, 1214. As further shown, the rocker arm 1204 comprises a LM+ mechanism 1218 of the type substantially similar to that illustrated and described above relative to FIG. 2. In this case, hydraulic fluid is provided to the LM− mechanism 1216 via suitable passages formed in the rocker shaft and rocker arm 1204 and ball joint 1220. Similarly, hydraulic fluid is provided to the LM+ mechanism 1218 via suitable passages formed in the rocker shaft and rocker arm 1204. However, in this implementation, the check valve 732 of the prior embodiment is replaced by a control valve 1222 to establish the hydraulic lock required to maintain the actuator piston in an extended state. The embodiment of FIG. 12 is further characterized by the arrangement of the LM+ mechanism 1218 to interact with only a single engine valve 1214 via a suitable bridge pin 1224.

In this embodiment, the LM− mechanism 1216 includes a relatively strong spring to outwardly bias the outer plunger of the locking mechanism against the pushrod 1202 so that the pushrod 1202 is biased into contact with a cam and so that the rocker arm is biased in direction of the engine valves 1212, 1214. In this implementation, the outer plunger of the LM− mechanism 1216 is not travel limited during engine operation (as opposed to engine assembly, where imposing travel limits on the LM− mechanism 1216 facilitates assembly).

Given the configuration of the LM+ mechanism 1218, particularly the inwardly sprung actuator piston, a gap is provided between the actuator piston and the bridge pin when the LM+ mechanism 1218 is in its default state. Consequently, during this default state, the LM+ mechanism 1218 is not in series along the motion load path with the LM− mechanism 1216, as described above relative to FIG. 5. Further, despite the presence of the gap during the default state, the actuator piston would not be able to extend fully given the strength of the outer plunger piston spring as described above. In this case, then, the actuator piston is not able to fully extend until the main motion valve event has occurred, thereby creating a sufficient gap between the actuator piston and the bridge pin 1224 to permit full extension. When in the extended (activated) state, however, the actuator piston will not only convey the auxiliary valve actuation motions applied thereto, but will also convey the main valve actuation motions that are applied thereto to its corresponding engine valve 1214. In this case, the LM+ mechanism 1218 is placed in series with the LM− mechanism 1216 during the activated state of the actuator piston as described above relative to FIG. 5.

Figure 13:
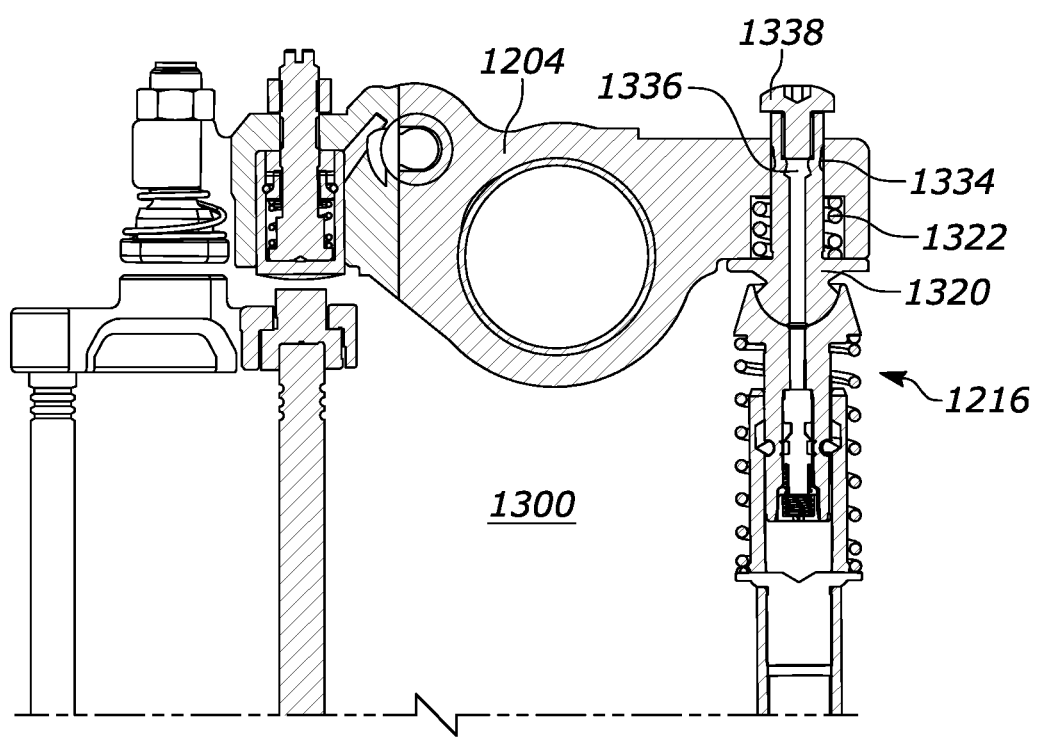
FIG. 13 is a partial cross-sectional view of a second embodiment of a valve actuation system in accordance with the embodiment of FIG. 5.

FIG. 13 illustrates a partial cross-sectional view of a valve actuation system 1300 in accordance with the embodiment of FIG. 5. In particular, the embodiment illustrated in FIG. 13 is substantially identical to the embodiment of FIG. 12 with the exception that the spherical joint 1220 is replaced with an outwardly biased, travel limited, sliding pin 1320. In this case, the outer plunger spring of the LM− mechanism 1216 is preferably designed with low preload during zero or low valve lifts (e.g., on base circle), and has a spring rate required to get the peak forces for controlling the full range of motion of the rocker arm 1204 over main valve actuation motions during deactivated mode operation.

On the other hand, a sliding pin spring 1322 used to outwardly bias the sliding pin 1320 is configured with a comparatively high preload and short stroke (substantially similar to the actuator piston spring 918 discussed above). Because the sliding piston 1320 is able to slide within its bore, the sliding piston 1320 includes an annular channel 1334 and radial opening 1336 aligned therewith such that registration of the annular channel 1334 with a fluid supply passage throughout the full stroke of sliding piston 1320 ensures continuous fluid communication between the rocker arm 1204 and the LM− mechanism 1216. Additionally, a stroke adjustment screw 1338 serves to limit travel of the sliding pin 1320 out of it bore toward the LM− mechanism 1216. As described relative to the travel limit capability applied to the actuator piston 702 above, the stroke adjustment screw 1338 prevents the full force of the sliding pin spring 1322 from being applied to the LM− mechanism 1216, which would otherwise be overloaded, potentially interfering with operation thereof. By appropriately selecting stroke provided by the stroke adjustment screw 1338, i.e., equal to the motion that must be lost by the LM+ mechanism during its default operating state, the lash provided to the locking elements within the LM− mechanism 1216 may be selected to ensure proper operation thereof, as described previously. In effect, then, the assembly of the sliding pin 1320, sliding pin spring 1322 and stroke adjustment screw 1338 constitute a portion of the LM+ mechanism in this embodiment.

As set forth above, various specific combinations of outwardly-(extended) and inwardly-sprung (retracted) elements within the LM+ and LM− mechanisms may be provided, with traveling limiting as required. More generally, in one implementation, the LM− mechanism (more specifically, an element or component thereof) may be biased into an extended position and the LM+ mechanism (again, more specifically, an element or component thereof) may be biased into a retracted position. In this case, the extended position of the LM− mechanism may be travel limited. In another implementation of any given embodiment, the LM− mechanism may be biased by a first force into an extended position and the LM+ mechanism may be biased by a second force also into an extended position. In this case, the first biasing force is preferably greater than the second biasing force. Additionally, once again, the extended position of the LM− mechanism may be travel limited. In yet another implementation, the LM− mechanism may be biased into an extended position and the LM+ mechanism may also be biased into an extended position. In this case, however, the extended position of the LM+ mechanism is travel limited. In this implementation, a possible benefit of limiting the travel of the LM+ mechanism is to allow zero load on the valvetrain on while on cam base circle to reduce bushing wear.

Figure 15:
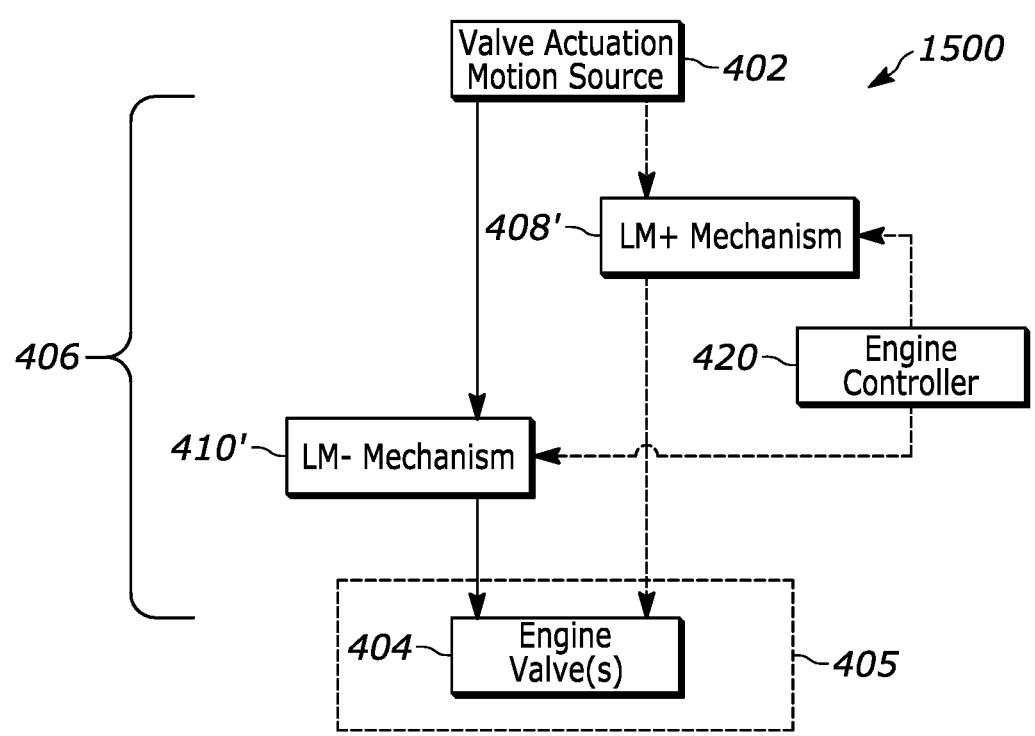
FIG. 15 is a schematic illustration of an embodiment of a valve actuation system in accordance with the instant disclosure.

As noted above with respect to FIG. 4, and as shown with regard to FIG. 15 in which like reference numerals refer to like elements as compared to FIG. 4, a system 1500 may be provided in which the LM− mechanism 410' is arranged within the valve actuation motion path 406 and parallel to the LM+ mechanism 408'. More particularly, the LM+ mechanism 408' shown in FIG. 15 is parallel with the LM− mechanism 410' during the activated state of the LM+ mechanism 408' but not during the default operating state of the LM+ mechanism 408' (as illustrated by the dashed lines between the LM+ mechanism 408' and the engine valves 404). In this manner, the LM+ mechanism 408' only plays a role in conveying auxiliary valve actuation motions received by the LM+ mechanism 408' but is otherwise uninvolved in the conveyance of main valve actuations motions along the valve actuation load path 406.

In particular, when the LM+ mechanism 408' is in its default operating state, the LM+ mechanism 408' is configured to lose any auxiliary valve actuation motions applied thereto by the valve actuation motion source 402. On the other hand, when the LM+ mechanism 408' is in its activated operating state, i.e., when it is controlled to convey any auxiliary valve actuation motions applied thereto, the LM+ mechanism 408' participates in the conveyance of the auxiliary valve actuation motions that are received from the valve actuation source 402. Stated another way, the ability of the LM+ mechanism 408' to convey auxiliary valve actuation motions is independent of operation of the LM− mechanism 410'. Thus configured, the valve actuation system 1500 facilitates operation of the cylinder 405, and consequently the internal combustion engine, in a positive power mode, a deactivated mode or an auxiliary mode (e.g., engine braking) in systems having a single valve actuation motions source 102 providing all valve actuation motions to the engine valve(s) 404. That is, the system 1500 is capable of implementing the method illustrated with reference to FIG. 14 and as described above. In this instance, however, the provisioning of the LM− and LM+ mechanisms at block 1402 is done such that the LM− and LM+ mechanisms are parallel to each other within the valve actuation load path and occurs, respectively, in a valve bridge and a rocker arm as described in further detail below.

Figure 16:
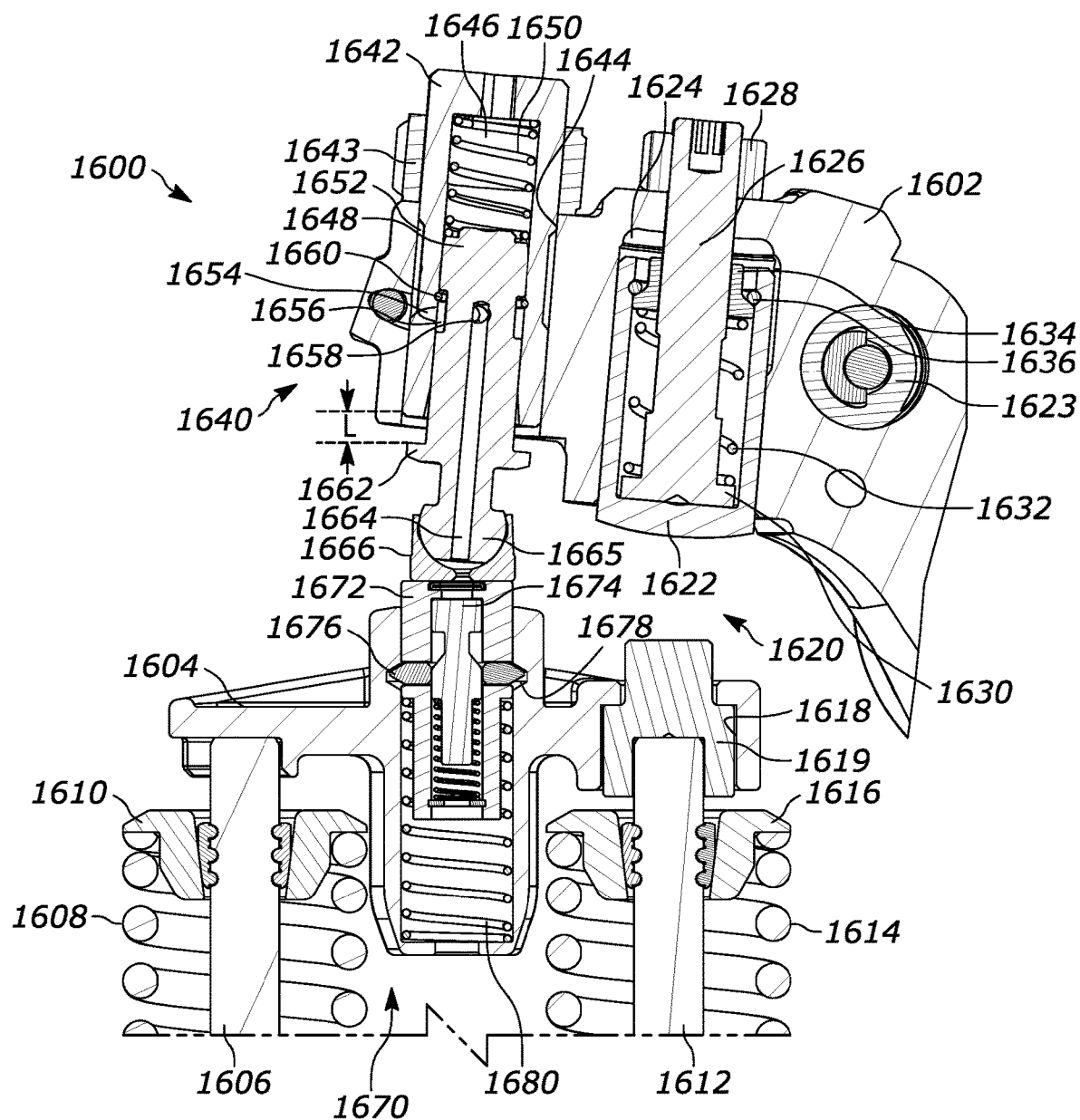
FIG. 16 is a cross-sectional, elevation side view of a first implementation of a valve actuation system in accordance with the embodiment of FIG. 15.

FIGS. 16-23 illustrate implementations a valve actuation system 1600, 2000 in accordance with the embodiment of FIG. 15. Referring now to FIG. 16, a first implementation of the valve actuation system 1600 comprises a rocker arm 1602 operatively connected to a valve bridge 1604 via a sliding e-foot assembly 1640 and a LM− mechanism 1670 on one hand, and via a LM+ mechanism 1620 on the other hand. As illustrated, the LM− mechanism 1670 is arranged in the valve bridge 1604 in a manner substantially similar to the embodiment illustrated in FIG. 6. As in that prior embodiment, the LM− mechanism 1670 is of the type illustrated and described in FIG. 1 above. As further shown in this embodiment, the LM+ mechanism 1620 is arranged in the rocker arm 1602 and is of a type of hydraulically-controlled actuator in which the actuator piston 1622 is biased into a retracted position, as opposed to the outwardly-biased actuator embodiment described above relative to FIG. 2. Thus, the LM+ mechanism 1620 is arranged in parallel with the LM− mechanism 1670 within the valve actuation load path established rocker arm 1602 and valve bridge 1604, in accordance with FIG. 15.

As known in the art, the valve bridge 1604 is operatively connected to at least two engine valves 1606, 1612 that are, in turn, biased into a closed position and into contact with the valve bridge 1604 through operation of respective valve springs 1608, 1614 and spring retainers 1610, 1616. As further shown, the LM− mechanism 1670 is disposed in a central bore defined in the valve bridge 1604 and comprises an outer plunger 1672 and inner plunger 1674. Locking elements in the form of wedges 1676 are provided, which wedges are configured to engage with an annular outer recess 1678 formed in a surface defining the central bore. The outer plunger 1672 is biased out of the bore and into contact with the sliding e-foot assembly 1640 by an outer plunger spring 1680. As described above, in the absence of hydraulic control applied to the inner plunger 1674 (via the sliding e-foot assembly 1640), the wedges 1676 extend out of openings formed in the outer plunger 1672, thereby engaging the outer recess 1678 and effectively locking the outer plunger 1672 in place relative to the valve bridge 1604. In this state, any valve actuation motions applied to the valve bridge 1604 via the outer plunger 1672 are conveyed to the valve bridge 1604 and ultimately to the engine valves 1606, 1612. However, as further described above, provision of sufficiently pressurized hydraulic fluid to the top of the inner plunger 1674 permits the wedges 1676 to retract and disengage from the outer recess 1678, thereby effectively unlocking the outer plunger 1672 relative to the valve bridge 1604 and permitting the outer plunger 1672 to slide freely within its bore, subject to a bias provided by an outer plunger spring 1680 toward the rocker arm. In this state, any valve actuation motions applied to the outer plunger 1672 will cause the outer plunger 1672 to reciprocate in its bore. In this manner, and presuming the travel of the outer plunger 1672 within its bore is greater than the maximum extent of any applied valve actuation motions, such valve actuation motions are not conveyed to the engine valves 1606, 1612 and are effectively lost such that the corresponding cylinder is deactivated.

The LM+ mechanism 1620 in the illustrated implementation comprises an actuator piston 1622 slidably disposed in a first bore 1624 formed in the rocker arm 1602, where the actuator piston 1622 is inserted into the first bore 1624 at an open end thereof. As illustrated, the first bore 1624 is configured such that the LM+ mechanism 1620 is aligned with a first engine valve 1612 of the at least two engine valves 1606, 1612. A lash adjustment screw 1626 also extends into the first bore 1624 from an opening formed in the otherwise closed end of the first bore 1624 and also extends into an interior space formed in the actuator piston 1622. The lash adjustment screw 1626 comprises a shoulder or flange 1630 extending radially at a distal end thereof and configured to support one end of an actuator spring 1632. In turn, another end of the actuator spring 1632 abuts a spring retainer 1634 that is fixedly maintained in position relative to the actuator piston 1622 by a suitable fastener, such as a snap ring 1636. In this manner, the actuator piston 1622 is biased into the first bore 1624 by the actuator spring 1632 to the extent permitted by abutment of the actuator piston 1622 with a lower end (adjacent the shoulder 1630) of the lash adjustment screw 1626. Threads formed at the interface of the lash adjustment screw 1626 and rocker arm 1602 permit the lash adjustment screw 1626 to be adjusted such that a distance (lash) between the actuator piston 1622 and a bridge pin 1619 (described in further detail below) when the actuator piston 1622 is in its fully retracted state can be selected as desired. As known in the art, a first locking nut 1628 may be employed to retain the lash adjustment screw 1626 in its desired position.

Hydraulic passages (not shown) formed in the rocker arm 1602 may be provided in accordance with well-known techniques to supply hydraulic fluid to a control valve 1623 also disposed in the rocker arm 1602. Also in accordance with well-known techniques, the control valve 1623 supplies the hydraulic fluid to the first bore 1624 such that the actuator piston 1622, if free to slide out of the first bore 1624, overcomes the biasing force of the actuator spring 1632 and extends out of the first bore 1624. A locked volume of fluid thus established in the first bore 1624 by the control valve 1623 rigidly maintains the actuator piston 1622 in its extended position until such time that hydraulic fluid is no longer supplied to the control valve 1623, thereby permitting the locked volume of fluid to escape and the actuator spring 1632 to bias the actuator piston once again 1622 back into the first bore 1624.

The implementation illustrated in FIG. 16 is particularly characterized (relative to the implementation illustrated in FIGS. 20-23) by the provision of the sliding e-foot assembly 1640. As shown, the sliding e-foot assembly 1640 comprises a housing 1642 mounted in a second bore 1644 formed in the rocker arm 1602. For example, an exterior surface of the housing 1642 may have a threaded engagement with an interior surface of the second bore 1644 such that vertical positioning of the housing 1642 (and, consequently, positioning of the sliding e-foot assembly 1640 relative to the LM− mechanism 1670) within the second bore 1644 may be selected through rotation of the housing 1642. Such vertical alignment may be maintained by a second locking nut 1643 engaging the threaded surface of the housing 1642. As illustrated, the second bore 1644 is configured such that the sliding e-foot assembly 1640 is aligned with the LM− mechanism 1670, i.e., the center of the valve bridge 1604.

The housing 1642 comprises an interior bore 1646 with an open end thereof facing the valve bridge 1604 when deployed within the second bore 1644. A sliding member or piston 1648 is disposed in the interior bore 1646 of the housing 1642 and is biased out of the interior bore 1646 by a sliding member spring 1650 interposed between the housing 1642 and the sliding member 1648. A shoulder or flange 1662 is formed on a distal end of the sliding member 1648 such that solid contact between the shoulder 1662 and the housing 1642 limits travel of the sliding member 1648 into the interior bore 1646. An inner annular channel 1656 is formed on and extends longitudinally along an outer surface of the sliding member 1648, and a snap ring 1660 or the like may be deployed within the inner annular channel 1656 and between the housing 1642 inner surface and the sliding member 1648. In this manner, the snap ring 1660 limits travel of the sliding member 1648 out of the interior bore 1646 according to the longitudinal extent of the inner annular channel 1656. Thus configured, and absent any countervailing force applied to the sliding member 1648, the sliding member 1648 is continuously biased by the sliding member spring 1650 out of the interior bore 1646, thereby establishing a lash space, L, between the shoulder 1662 of the sliding member 1648 and the housing 1642.

As further shown in FIG. 16, the housing 1642 comprises an outer annular channel 1652 extending longitudinally along the outer surface of the housing 1642. The outer annular channel 1652 is aligned with a hydraulic passage (not shown) formed in the rocker arm 1602 and providing a selectively controlled or switched supply of hydraulic fluid in accordance with known techniques, for example, via a rocker shaft and solenoid. The housing further comprises at least one opening 1654 formed in a sidewall of the housing 1642 and aligned with the outer annular channel 1652 such that fluidic communication is provided between the outer annular channel 1652 and the interior bore 1646 of the housing 1642. In turn, the sliding member 1648 comprises a central, longitudinal bore 1664 extending through a spherical or ball end 1665 of the sliding member 1648. The sliding member 1648 also comprises a transverse bore 1658 establishing fluidic communication between the inner annular channel 1656 of the sliding member 1648 and the longitudinal bore 1646. Finally, the sliding member 1648 has a swivel or e-foot 1666 attached to the spherical end 1665 of the sliding member 1648 in accordance with known techniques. The e-foot 1666 includes an opening that permits continuous fluidic communication with the longitudinal bore 1664 through the e-foot 1666 and despite movement of the e-foot 1666 relative to the spherical end 1665.

Thus configured, when the inner annular channel 1656 is longitudinally aligned with the opening 1654, hydraulic fluid selectively provided to the outer annular channel 1652 is able to flow into the inner annular channel 1656, then into the transverse bore 1658 and longitudinal bore 1664 and out through the opening formed in the e-foot 1664.

FIG. 16 illustrates the operating condition in which both the LM− mechanism 1670 and the LM+ mechanism are both in their default operating states as described above. Additionally, FIG. 16 illustrates the condition in which the rocker arm 1602 is controlled according to a sub-base circle region of the single cam (not shown), i.e., when neither any main nor auxiliary valve actuation motions are being applied to the rocker arm 1602. Additionally, as known in the art, such sub-base regions result in the maximum displacement of the rocker arm 1602 away from the valve bridge 1604. During this operating condition, the sliding member 1648 is permitted to extend out of the inner bore 1646 to its maximum extent, as shown in FIG. 16. Preferably, the configuration of the sliding member 1648, the outer plunger 1672 and their respective biasing springs 1650, 1680 is such that contact between a lower surface of the e-foot 1666 and an upper surface of the outer plunger 1672 is maintained even during this maximum displacement of the rocker arm 1602, thereby permitting fluid communication between the sliding member 1648 and the inner plunger 1674. In a presently preferred embodiment, the sliding member spring 1650 is selected to provide sufficient force to bias the rocker arm 1602 into contact with the single cam throughout all operating conditions of the valve actuation system 1600.

Figure 17:
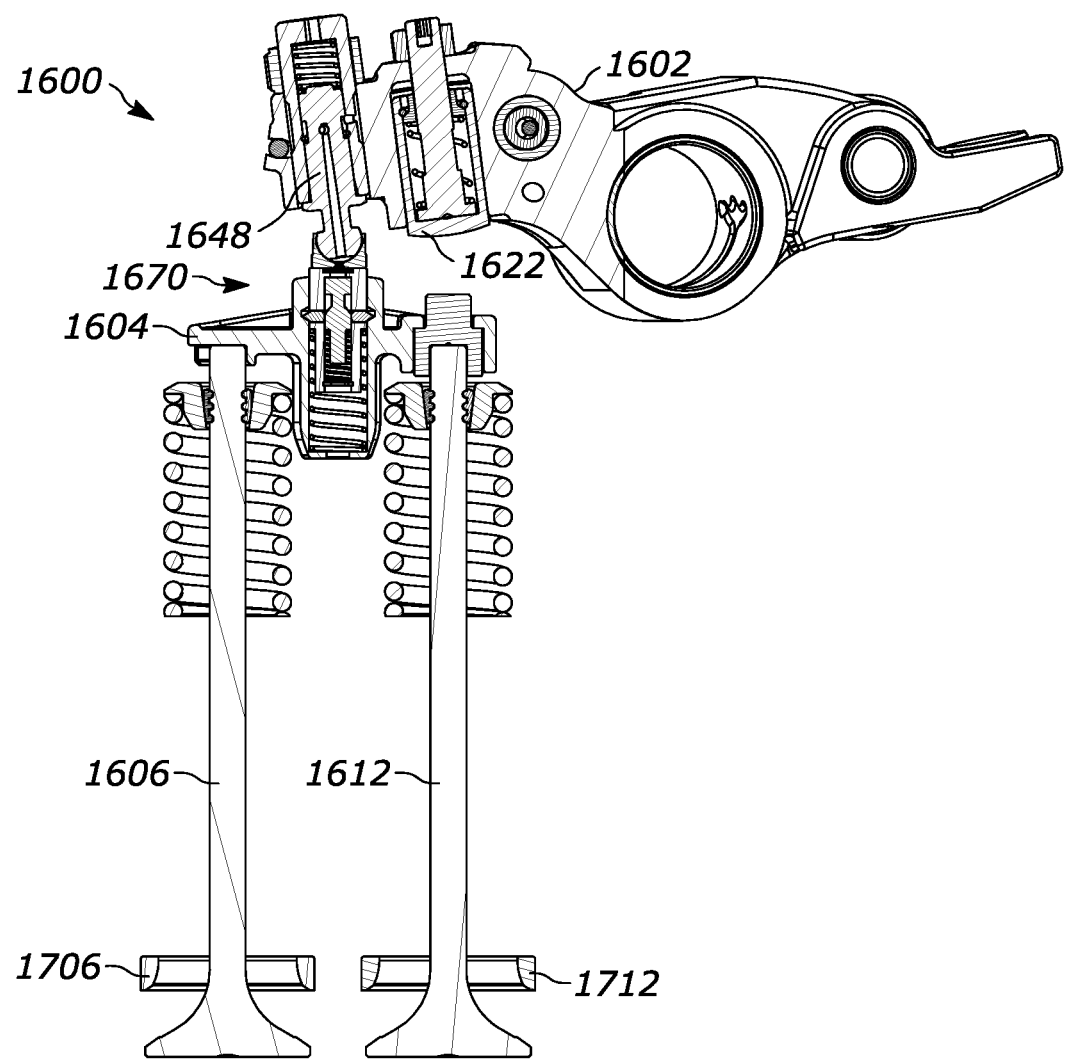
FIGS. 17-19 are cross-sectional, elevation side views of the first implementation in accordance with FIG. 16 during various operational states.
Figure 18:
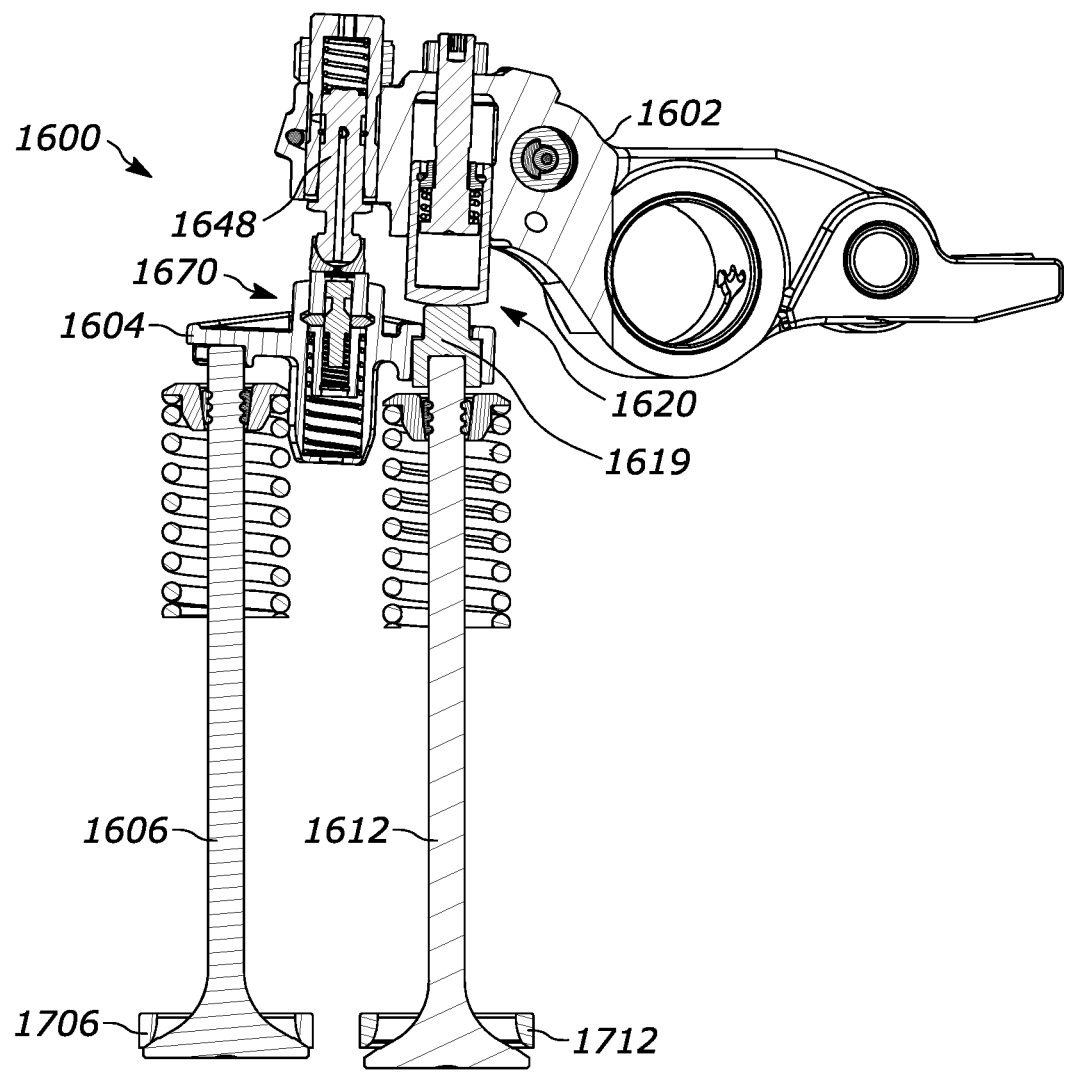
Figure 19:
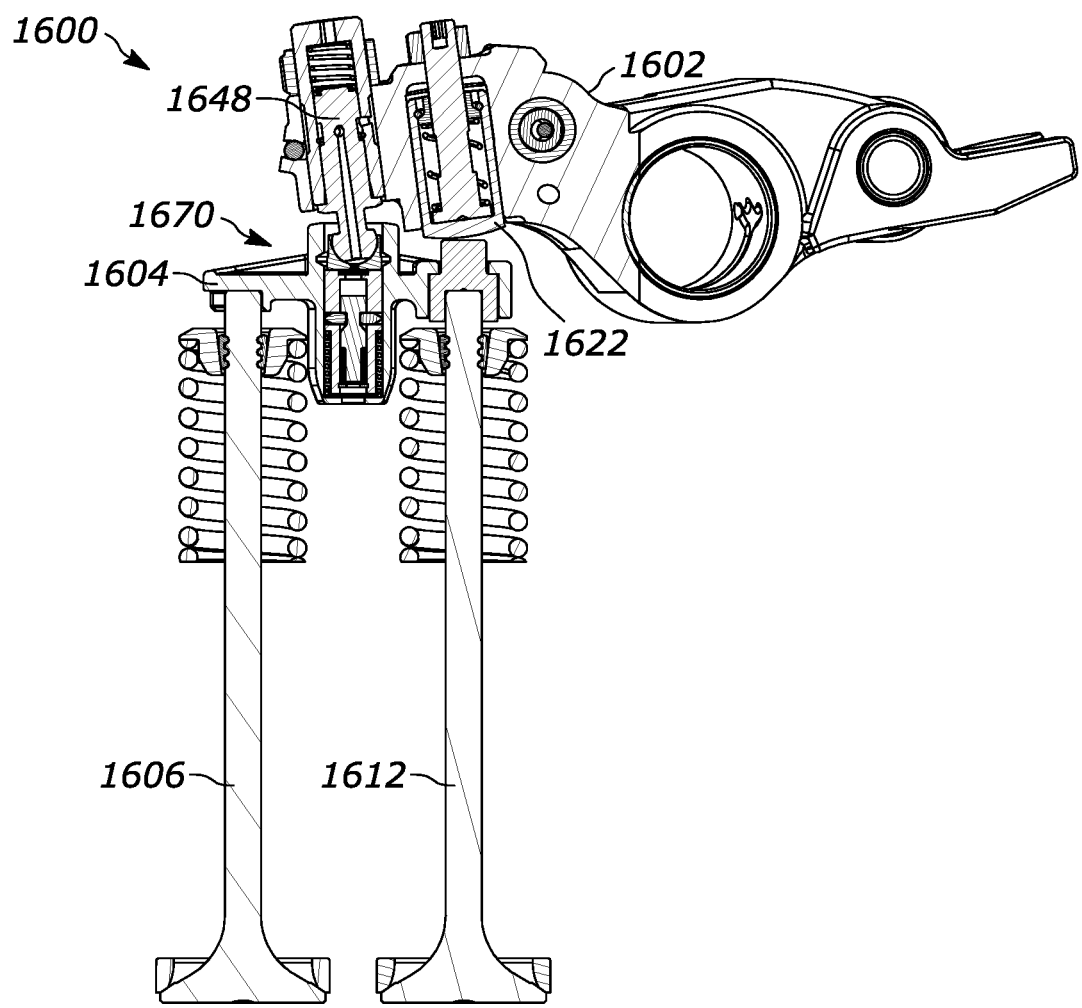

Referring now to FIGS. 17-19, various operating conditions of the valve actuation system 1600 are further illustrated and described. Note that, in all operating conditions illustrated in FIGS. 17-19, the lash, L, between the sliding member 1648 and the housing 1642 has been taken up completely, i.e., the sliding member 1648 makes solid contact with the lower surface of the housing 1642 in response to the applied valve actuation motions. Prior to such full uptake of the lash space, L, any valve actuation motions applied to the housing 1642 are lost until such time that the sliding member 1648 makes solid contact with the lower surface of the housing 1642. As a result, where the lash, L, is set to be at least as large as any auxiliary valve actuation motions provided below the base circle lift of the single cam, as known in the art, any valve actuation lifts below the base circle lift will be lost through this operation of the sliding member 1648 relative to the housing 1642.

FIG. 17 illustrates the same operating condition of the valve actuation system 1600 as illustrated in FIG. 16 (i.e., both the LM− mechanism 1670 and the LM+ mechanism are both in their default operating states) but where the rocker arm 1602 is controlled according to maximum lift region of the single cam, i.e., at the peak of the main valve actuation motion being applied to the rocker arm 1602. As a result, as shown, the engine valves 1606, 1612 are lifted from their respective valve seats 1706, 1712 to the maximum extent.

FIG. 18 illustrates an operating condition of the valve actuation system 1600 in which the LM− mechanism 1670 is in its default operating state and the LM+ mechanism 1620 is in its activated state. As shown, and described above, this results in extension of the actuator piston 1622 to its fullest extent (which may be achieved prior to contact of the actuator piston 1622 with the bridge pin 1619), while the LM− mechanism 1670 remains in its locked state. As further shown in FIG. 18, the rocker arm 1602 is controlled according to maximum auxiliary lift region of the single cam, i.e., at the peak of an auxiliary valve actuation motion, such as a compression-release valve actuation motion, being applied to the rocker arm 1602. Assuming the peak of the auxiliary valve actuation motion is equal to the base circle defined by the single cam, the sliding member 1648 takes up the lash space, L, but applies no further valve actuation motions to the valve bridge 1604. On the other hand, the extension of the actuator piston 1622 to its fullest extent will cause the actuator piston 1622 to contact the bridge pin 1619 such that the peak auxiliary motion lift will cause the first engine valve 1612 to be lifted off of its valve seat 1712 while the other engine valve 1606 remains in its valve seat 1706, as shown.

FIG. 19 illustrates an operating condition of the valve actuation system 1600 in which the LM− mechanism 1670 is in its activated operating state and the LM+ mechanism 1620 is in its default state. As shown, and described above, this results in retraction of the actuator piston 1622 while the LM− mechanism 1670 is placed into its unlocked state. As further shown in FIG. 19, similar to FIG. 17, the rocker arm 1602 is controlled according to maximum lift region of the single cam, i.e., at the peak of the main valve actuation motion being applied to the rocker arm 1602. Because the LM− mechanism 1670 is in its activated operating state, the outer plunger 1672 is permitted to reciprocate with the central bore of the valve bridge 1604 such that no valve actuation motions are applied to the valve bridge 1604. Additionally because the actuator piston 1622 is retracted, the actuator piston 1622 is unable to contact the bridge pin 1619 with the result that no auxiliary valve actuation motions are applied to the first engine valve 1612. To the extent that no valve actuation motions are applied to the engine valves 1606, 1612, a desired operating state such as cylinder deactivation can be effectuated.

Figure 20:
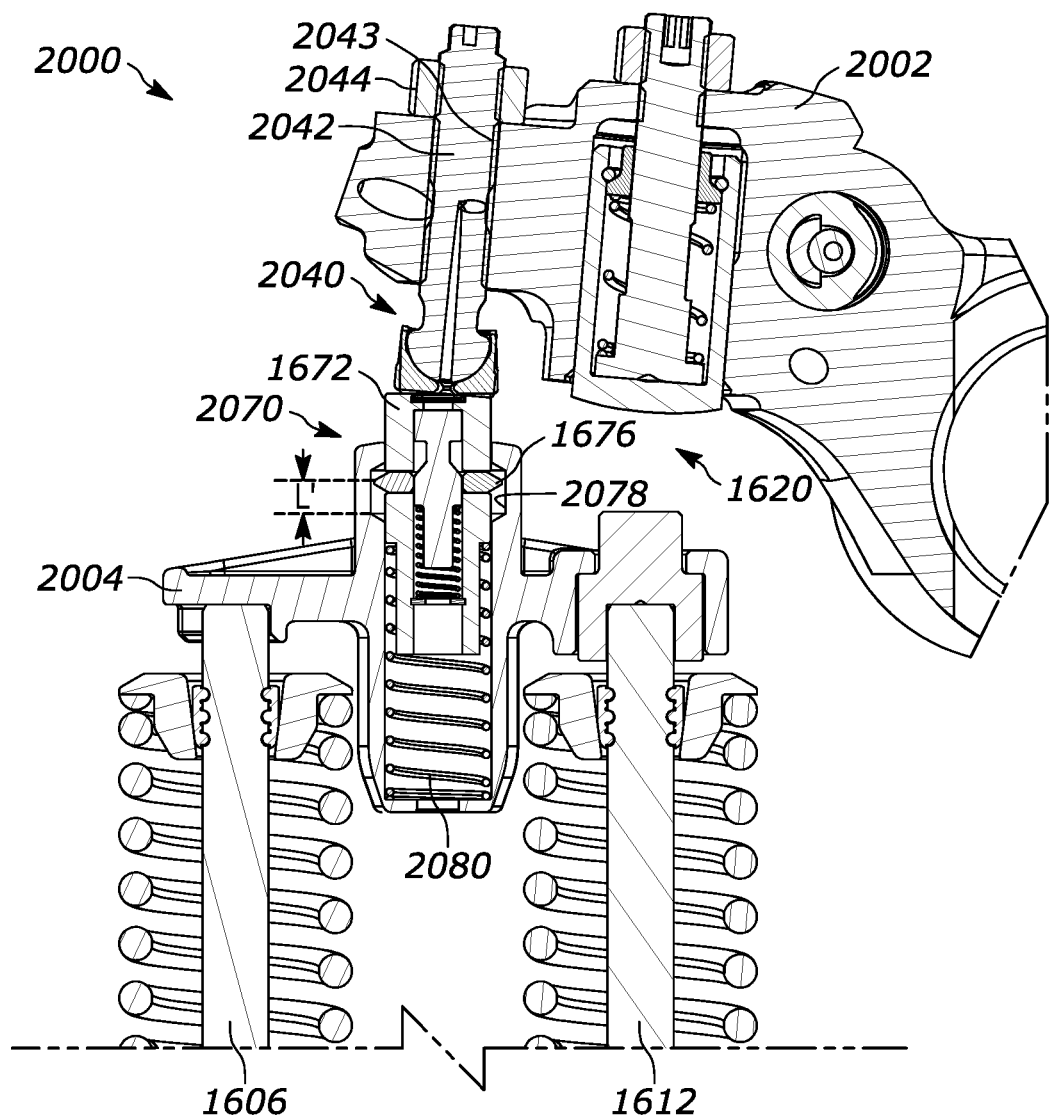
FIG. 20 is a cross-sectional, elevation side view of a second implementation of a valve actuation system in accordance with the embodiment of FIG. 15.

Referring now to FIG. 20, a second implementation of the valve actuation system 2000 comprises a rocker arm 2002 operatively connected to a valve bridge 2004 via a fixed e-foot assembly 2040 and a LM− mechanism 2070 on one hand, and via the LM+ mechanism 1620 on the other hand. Substantially similar to the system 1600 of FIG. 16, the LM− mechanism 2070 is arranged in the valve bridge 1604 in a manner substantially similar to the embodiment illustrated in FIG. 6. As in that prior embodiment, the LM− mechanism 1670 is of the type illustrated and described in FIG. 1 above. The LM+ mechanism 1620 is once again arranged in the rocker arm 1602 and of the type described above relative to FIGS. 16-19. Once again, the LM+ mechanism 1620 is arranged in parallel with the LM− mechanism 2070 within the valve actuation load path established rocker arm 2002 and valve bridge 2004, in accordance with FIG. 15. Differences between the implementation of FIGS. 16-19 and the implementation of FIGS. 20-23 are found in the specific configuration of the LM− mechanism 2070 and the fixed e-foot assembly 2040 (relative to the sliding e-foot assembly 1640).

More specifically, the fixed e-foot assembly 2040 comprises a second lash adjustment screw 2042 threadedly mounted in a second bore 2043 formed in rocker arm 2002. As with the sliding member 1642 in the implementation of FIG. 16, the second bore 2043 and the second lash adjustment screw 2042 are configured to be in alignment with the LM− mechanism 2070. Vertical positioning of the second lash adjustment screw 2042 may be established by adjustments to the threaded engagement with the second bore 2043 and maintained through the use of a second lock nut 2044, as known in the art. Similar to the sliding member 1642, the second lash adjustment screw 2042 comprises transverse and longitudinal bores formed therein, as well a spherical end and e-foot in fluid communication with the longitudinal bore. In this manner, the second lash adjustment screw 2042 is capable of supplying selectively controlled hydraulic fluid (as in the implementation of FIGS. 16-19) to the LM− mechanism 2070.

Because the e-foot assembly 2040 is "fixed" in the sense that a sliding member 1642 is substituted with the generally fixed second lash adjustment screw 2042, the need for lash space in the system 2000 is instead provided by the LM− mechanism 2070. More particularly, whereas the annular outer recess 1678 in the implementation of FIG. 16 is configured having longitudinal extent substantially similar to the thickness of the locking elements 1676, the annular outer recess 2078 in the implementation of FIG. 20 is configured to have a longitudinal extent that permits lash space, L', to be established between a lower surface of the annular outer recess 2078 and a lower surface of the locking elements 1676. Additionally, in this case, an outer plunger spring 2080 is selected to not only bias the outer plunger 1672 out of the valve bridge's central bore, but to also provide sufficient force (through contact of the outer plunger 1672 with the fixed e-foot assembly 2040) to bias the rocker arm 2002 once again into contact with the single cam throughout all operating conditions of the valve actuation system 2000.

Figure 21:
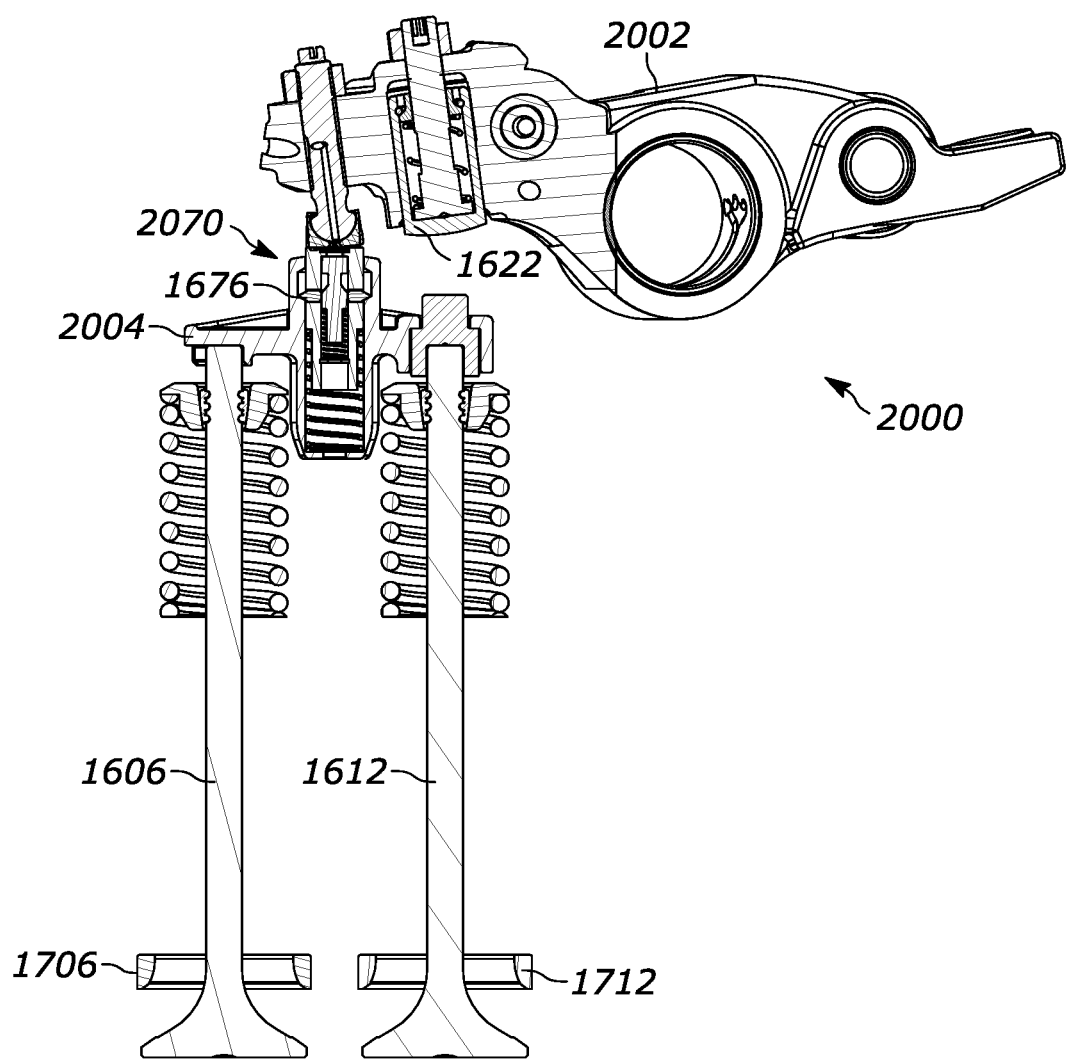
FIGS. 21-23 are cross-sectional, elevation side views of the second implementation in accordance with FIG. 20 during various operational states.
Figure 22:
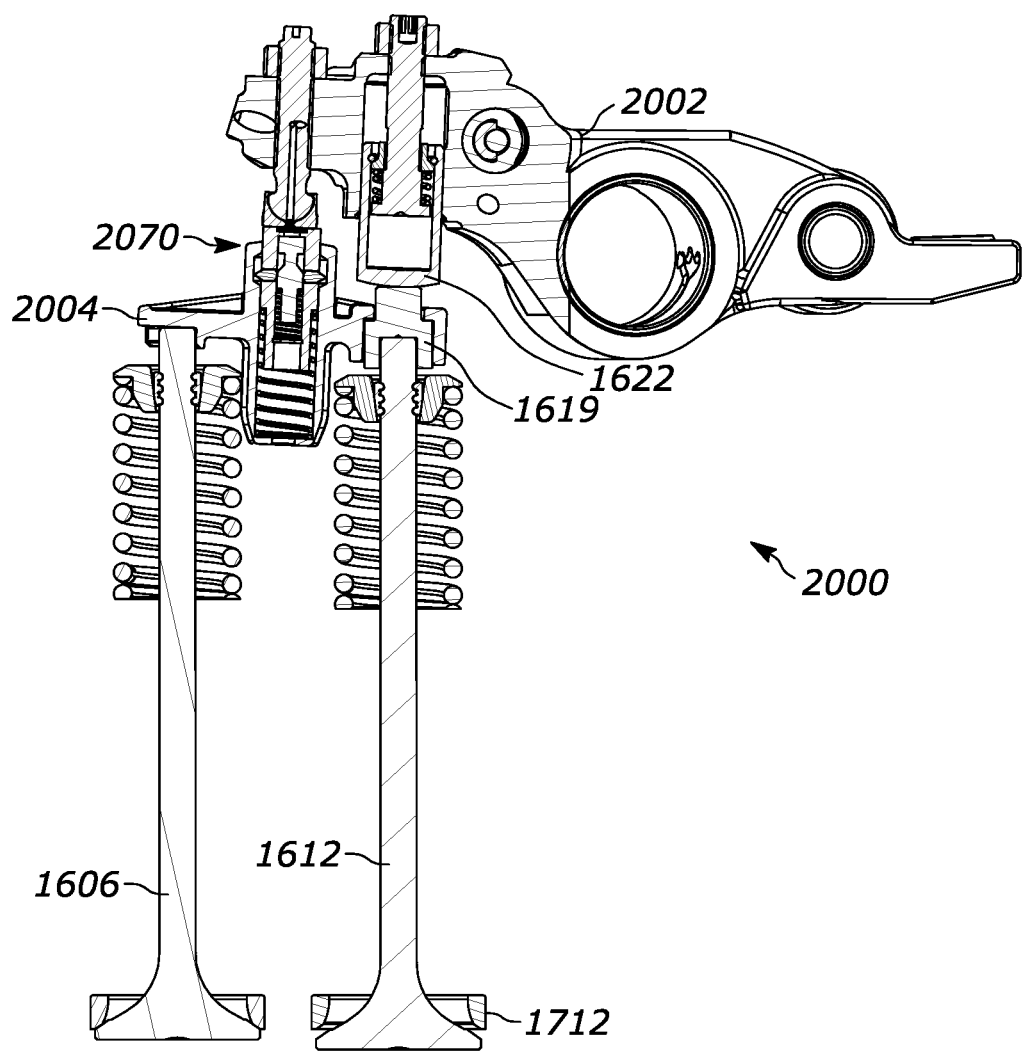
Figure 23:
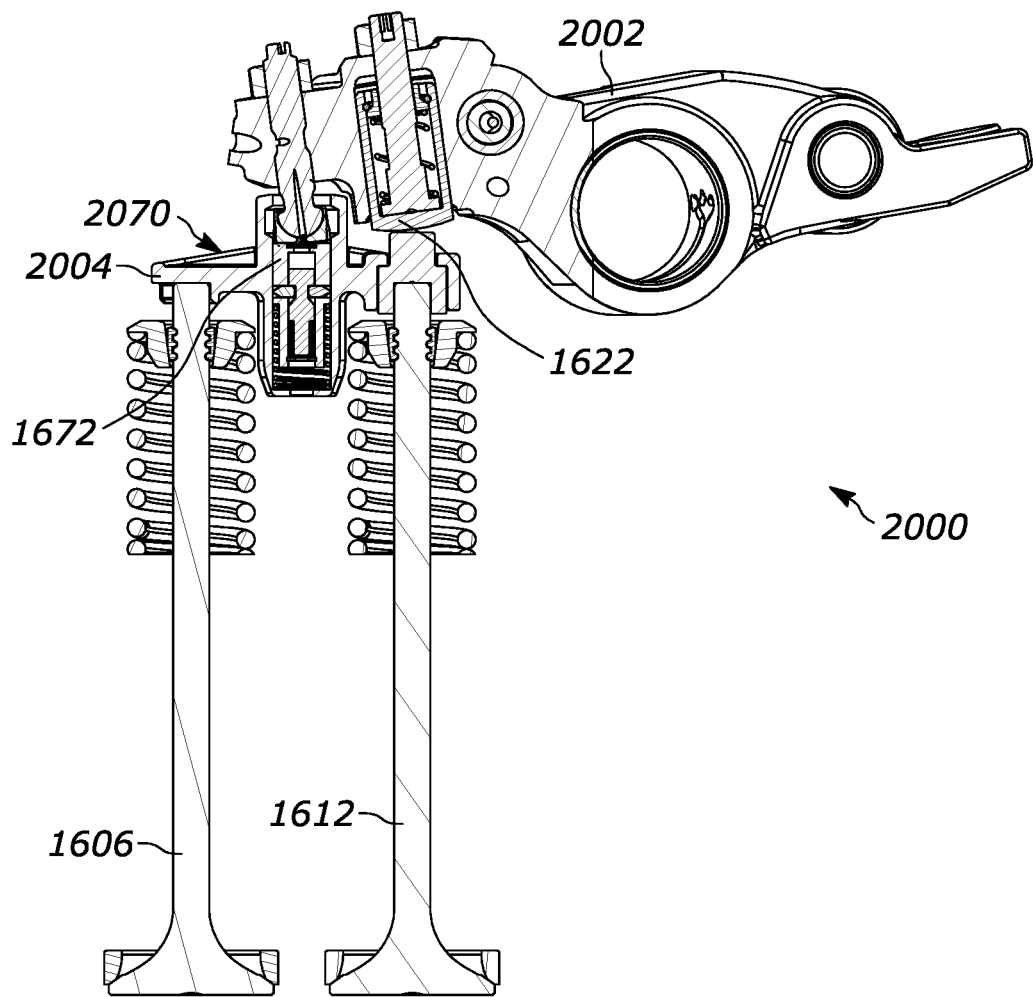

Referring now to FIGS. 21-23, various operating conditions of the valve actuation system 2000 are further illustrated and described. Once again, it will be noted that, in all operating conditions illustrated in FIGS. 21-23, the lash, L', between the locking elements 1676 and the annular outer recess 2078 has been taken up completely, i.e., the lower surface of the locking element 1676 makes solid contact with the lower surface of the annular outer recess 2078 in response to the applied valve actuation motions. Prior to such full uptake of the lash space, L', any valve actuation motions applied to the outer plunger 1672 are lost until such time that the locking element 1676 makes solid contact with the annular outer recess 2078. As a result, where the lash, L', is set to be at least as large as any auxiliary valve actuation motions provided below the base circle lift of the single cam, as known in the art, any valve actuation lifts below the base circle lift will be lost through this operation of the locking element 1676 and the annular outer recess 2078.

FIG. 21 illustrates the same operating condition of the valve actuation system 2000 as illustrated in FIG. 20 (i.e., both the LM− mechanism 2070 and the LM+ mechanism 1620 are both in their default operating states) but where the rocker arm 2002 is controlled according to maximum lift region of the single cam, i.e., at the peak of the main valve actuation motion being applied to the rocker arm 2002. As a result, as shown, the engine valves 1606, 1612 are lifted from their respective valve seats 1706, 1712 to the maximum extent.

FIG. 22 illustrates an operating condition of the valve actuation system 2000 in which the LM− mechanism 2070 is in its default operating state and the LM+ mechanism 1620 is in its activated state. As shown, and described above, this results in extension of the actuator piston 1622 to its fullest extent (which may be achieved prior to contact of the actuator piston 1622 with the bridge pin 1619), while the LM− mechanism 2070 remains in its locked state. As further shown in FIG. 22, the rocker arm 2002 is controlled according to maximum auxiliary lift region of the single cam, i.e., at the peak of an auxiliary valve actuation motion, such as a compression-release valve actuation motion, being applied to the rocker arm 2002. Assuming the peak of the auxiliary valve actuation motion is equal to the base circle defined by the single cam, the outer annular recess 2078 takes up the lash space, L', but applies no further valve actuation motions to the valve bridge 2004. On the other hand, the extension of the actuator piston 1622 to its fullest extent will cause the actuator piston 1622 to contact the bridge pin 1619 such that the peak auxiliary motion lift will cause the first engine valve 1612 to be lifted off of its valve seat 1712 while the other engine valve 1606 remains in its valve seat 1706, as shown.

FIG. 23 illustrates an operating condition of the valve actuation system 2000 in which the LM− mechanism 2070 is in its activated operating state and the LM+ mechanism 1620 is in its default state. As shown, and described above, this results in retraction of the actuator piston 1622 while the LM− mechanism 2070 is placed into its unlocked state. As further shown in FIG. 23, similar to FIG. 21, the rocker arm 2002 is controlled according to maximum lift region of the single cam, i.e., at the peak of the main valve actuation motion being applied to the rocker arm 2002. Because the LM− mechanism 2070 is in its activated operating state, the outer plunger 1672 is permitted to reciprocate with the central bore of the valve bridge 2004 such that no valve actuation motions are applied to the valve bridge 2004. Additionally because the actuator piston 1622 is retracted, the actuator piston 1622 is unable to contact the bridge pin 1619 with the result that no auxiliary valve actuation motions are applied to the first engine valve 1612. To the extent that no valve actuation motions are applied to the engine valves 1606, 1612, a desired operating state such as cylinder deactivation can be effectuated.

While the various embodiments in accordance with the instant disclosure have been described in conjunction with specific implementations thereof, it is evident that many alternatives, modifications and variations will be apparent to those skilled in the art. In particular, it is understood that the various embodiments described herein may be applied to valve actuation systems having various types of valve train components. For example, as known in the art, valve train components such as rocker arms may be used to implement "resetting" in which auxiliary valve actuation motions are lost or absorbed by virtue of a lost motion mechanism being controlled to reset to a motion absorbing state prior to or during the onset of main event valve actuation motions. Thus, it is appreciated that valve actuation systems in accordance with the instant disclosure may be implemented using resetting rocker arm (i.e., capable of resetting operation) or non-resetting rocker arms (i.e., incapable of resetting operation). Accordingly, the preferred embodiments of the invention as set forth herein are intended to be illustrative only and not limiting so long as the variations thereof come within the scope of the appended claims and their equivalents.

What is claimed is:

1. A valve actuation system for use in an internal combustion engine comprising a cylinder, at least two engine valves associated with the cylinder and a valve actuation load path comprising a rocker arm and a valve bridge operatively connected to the at least two engine valves, the valve actuation system comprising:
a single cam configured to provide a main valve actuation motion and an auxiliary valve actuation motion so as to actuate the at least two engine valves via the valve actuation load path;
a lost motion subtracting mechanism arranged in the valve bridge and configured, in a first default operating state, to convey at least the main valve actuation motion and configured, in a first activated state, to lose the main valve actuation motion and the auxiliary valve actuation motion; and
a lost motion adding mechanism arranged in the rocker arm and configured, in a second default operating state, to lose the auxiliary valve actuation motion and configured, in a second activated state, to convey the auxiliary valve actuation motion, wherein the lost motion adding mechanism is arranged in parallel with the lost motion subtracting mechanism in the valve actuation load path at least during the second activated state.

2. The valve actuation system of claim 1, further comprising:
an engine controller configured to operate the internal combustion engine, using the lost motion subtracting mechanism and the lost motion adding mechanism, in:
a positive power mode in which the lost motion subtracting mechanism is in the first default operating state and the lost motion adding mechanism is in the second default operating state, or
a deactivated mode in which the lost motion subtracting mechanism is in the first activated operating state and the lost motion adding mechanism is in the second default operating state, or
an auxiliary mode in which the lost motion subtracting mechanism is in the first default operating state and the lost motion adding mechanism is in the second activated operating state.

3. The valve actuation system of claim 1, wherein the auxiliary valve actuation motion is at least one of an early exhaust valve opening valve actuation motion, a late intake valve closing valve actuation motion or an engine braking valve actuation motion.

4. The valve actuation system of claim 1, wherein the lost motion subtracting mechanism is a hydraulically-controlled, mechanical locking mechanism.

5. The valve actuation system of claim 1, wherein the lost motion adding mechanism is a hydraulically-controlled actuator.

6. The valve actuation system of claim 5, wherein the lost motion adding mechanism further comprises a hydraulically-controlled control valve providing hydraulic fluid to the hydraulically-controlled actuator.

7. The valve actuation system of claim 5, wherein the hydraulically-controlled actuator is aligned with a first engine valve of the at least two engine valves.

8. The valve actuation system of claim 1, further comprising:

a biasing component configured to bias the rocker arm into contact with the single cam.

9. The valve actuation system of claim 8, wherein the biasing component comprises a spring operatively connected to the rocker arm.

10. The valve actuation system of claim 8, wherein the biasing component comprises a spring disposed in the lost motion subtracting mechanism.

11. The valve actuation system of claim 8, further comprising:
 a sliding e-foot assembly arranged in the rocker arm and contacting the lost motion subtracting mechanism,
 wherein the biasing component comprises a spring biasing the sliding e-foot assembly into contact with the lost motion subtracting mechanism.

12. A method of operating an internal combustion engine comprising a cylinder and at least two engine valves associated with the cylinder and further comprising a single cam configured to provide a main valve actuation motion and an auxiliary valve actuation motion so as to actuate the at least two engine valves via a valve actuation load path comprising a rocker arm and a valve bridge, the method comprising:
 providing a lost motion subtracting mechanism arranged in the valve bridge and configured, in a first default operating state, to convey at least the main valve actuation motion and configured, in a first activated state, to lose the main valve actuation motion and the auxiliary valve actuation motion;
 providing a lost motion adding mechanism arranged in the rocker arm and configured, in a second default operating state, to lose the auxiliary valve actuation motion and configured, in a second activated state, to convey the auxiliary valve actuation motion, wherein the lost motion adding mechanism is arranged in parallel with the lost motion subtracting mechanism in the valve actuation load path at least during the second activated state; and
 operating the internal combustion engine in:
  a positive power mode in which the lost motion subtracting mechanism is in the first default operating state and the lost motion adding mechanism is in the second default operating state, or
  a deactivated mode in which the lost motion subtracting mechanism is in the first activated operating state and the lost motion adding mechanism is in the second default operating state, or
  an auxiliary mode in which the lost motion subtracting mechanism is in the first default operating state and the lost motion adding mechanism is in the second activated operating state.

* * * * *